United States Patent
Okita

(10) Patent No.: US 9,350,660 B2
(45) Date of Patent: May 24, 2016

(54) TRANSMISSION MANAGEMENT SYSTEM, TRANSMISSION SYSTEM, SELECTION METHOD, PROGRAM PRODUCT, PROGRAM SUPPLY SYSTEM, AND MAINTENANCE SYSTEM

(75) Inventor: Kunio Okita, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 50 days.

(21) Appl. No.: 14/006,985

(22) PCT Filed: Mar. 26, 2012

(86) PCT No.: PCT/JP2012/058767
§ 371 (c)(1),
(2), (4) Date: Sep. 24, 2013

(87) PCT Pub. No.: WO2012/133863
PCT Pub. Date: Oct. 4, 2012

(65) Prior Publication Data
US 2014/0022333 A1    Jan. 23, 2014

(30) Foreign Application Priority Data

Mar. 25, 2011 (JP) ................................ 2011-067768
Mar. 31, 2011 (JP) ................................ 2011-078783
Aug. 31, 2011 (JP) ................................ 2011-189171
Aug. 31, 2011 (JP) ................................ 2011-189185

(51) Int. Cl.
*H04N 7/14* (2006.01)
*H04L 12/801* (2013.01)
(Continued)

(52) U.S. Cl.
CPC ............ *H04L 47/12* (2013.01); *H04L 65/1069* (2013.01); *H04L 65/403* (2013.01); *H04N 7/147* (2013.01); *H04N 7/148* (2013.01); *H04N 7/15* (2013.01); *H04W 40/22* (2013.01)

(58) Field of Classification Search
CPC .. H04L 65/1069; H04L 65/403; H04W 40/22
USPC .......................... 370/260; 709/204; 348/14.08
See application file for complete search history.

(56) References Cited

U.S. PATENT DOCUMENTS

2011/0202757 A1* 8/2011 Nakagawa ............... G06F 21/33
                                                            713/153
2011/0216699 A1* 9/2011 Umehara ............ H04L 12/1813
                                                            370/328

(Continued)

FOREIGN PATENT DOCUMENTS

CN    101895991 A    11/2010
JP    2004-135062    4/2004

(Continued)

OTHER PUBLICATIONS

International Search Report Issued Apr. 24, 2012 in PCT/JP2012/058767 Filed Mar. 26, 2012.

(Continued)

*Primary Examiner* — Creighton Smith
(74) *Attorney, Agent, or Firm* — Oblon, McClelland, Maier & Neustadt, L.L.P.

(57) ABSTRACT

A transmission management system selects a relay apparatus to actually relay content data between a first terminal and a second terminal, from among a plurality of relaying apparatuses capable of relaying the content data for conversation between the first and second terminals. Before the content data is transmitted and received between the first and second terminals, prior transmission information is transmitted and received instead of the content data. Thereby, it is possible to select one relaying apparatus capable of actually relaying the prior transmission information with the fastest speed. Thereby, it is possible to select the relaying apparatus capable of relaying the highest quality with the fastest speed under an actual communication network environment.

12 Claims, 23 Drawing Sheets

(51) Int. Cl.
  *H04N 7/15* (2006.01)
  *H04L 29/06* (2006.01)
  *H04W 40/22* (2009.01)

(56) References Cited

U.S. PATENT DOCUMENTS

| | | | |
|---|---|---|---|
| 2011/0219060 A1* | 9/2011 | Ohwada | G06F 15/16 709/203 |
| 2012/0002003 A1* | 1/2012 | Okita | H04L 12/1827 348/14.11 |
| 2014/0029518 A1* | 1/2014 | Umehara | H04L 12/1813 370/328 |
| 2015/0009281 A1* | 1/2015 | Okita | H04L 12/1827 348/14.11 |

FOREIGN PATENT DOCUMENTS

| | | |
|---|---|---|
| JP | 2008-131240 A | 6/2008 |
| JP | 2008-131346 | 6/2008 |
| JP | 2008-225619 | 9/2008 |
| JP | 2008-227577 | 9/2008 |
| JP | 2009-164940 | 7/2009 |
| JP | 2011-059675 | 3/2011 |
| JP | 5691396 | 2/2015 |
| WO | 2011/021155 A1 | 2/2011 |

OTHER PUBLICATIONS

Office Action issued Aug. 19, 2015 in Japanese Patent Application No. 2011-189171.

Kenichiro Takano, et al., "Application Multicast Construction Method Tree for Many-to-Many Videoconferencing System" Information Processing Society Japan Technical Report, Jun. 3, 2005, pp. 41-46 (with English language translation).

Office Action issued Dec. 25, 2015 in Chinese Patent Application No. 201280014794.6 (with English translation).

* cited by examiner

FIG.2

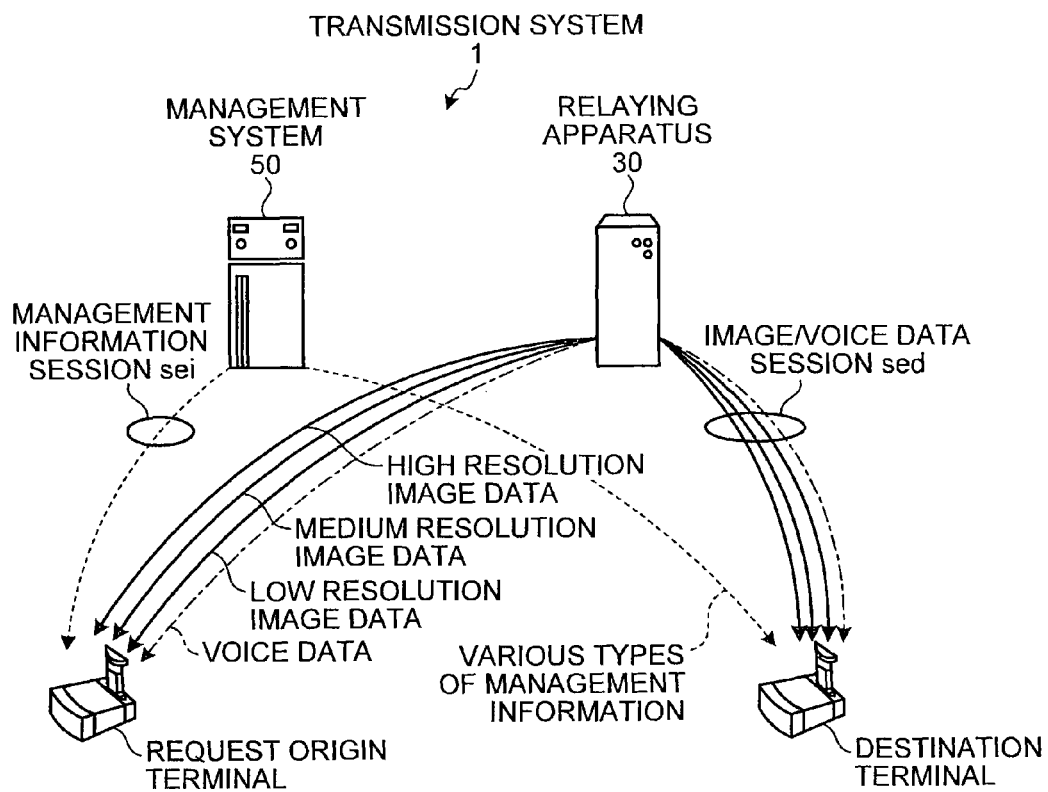

TRANSMISSION SYSTEM 1

MANAGEMENT SYSTEM 50

RELAYING APPARATUS 30

MANAGEMENT INFORMATION SESSION sei

IMAGE/VOICE DATA SESSION sed

HIGH RESOLUTION IMAGE DATA
MEDIUM RESOLUTION IMAGE DATA
LOW RESOLUTION IMAGE DATA
VOICE DATA

VARIOUS TYPES OF MANAGEMENT INFORMATION

REQUEST ORIGIN TERMINAL

DESTINATION TERMINAL

FIG.3A
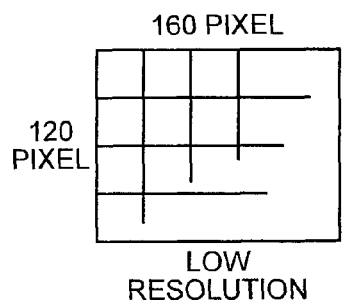
160 PIXEL
120 PIXEL
LOW RESOLUTION

FIG.3B
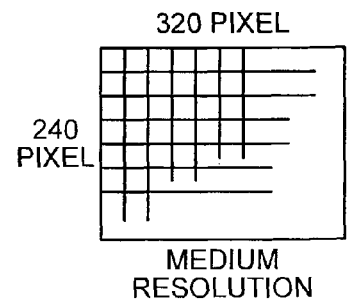
320 PIXEL
240 PIXEL
MEDIUM RESOLUTION

FIG.3C
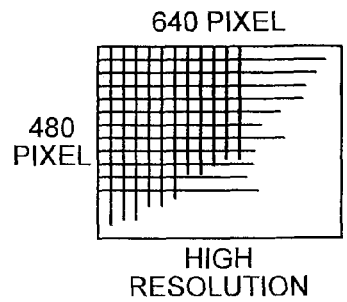
640 PIXEL
480 PIXEL
HIGH RESOLUTION

FIG.10

QUALITY CHANGE MANAGEMENT TABLE

| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.2.3 | MEDIUM IMAGE QUALITY |
| ... | ... |

FIG.11

RELAYING APPARATUS MANAGEMENT TABLE

| RELAYING APPARATUS ID | OPERATION STATE | RECEIVING DATE | IP ADDRESS OF RELAYING APPARATUS | MAXIMUM DATA TRANSMISSION SPEED [Mbps] |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.12

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.13

TERMINAL MANAGEMENT TABLE

| TERMINAL ID | DESTINATION NAME | OPERATION STATE | RECEIVING DATE | IP ADDRESS OF TERMINAL |
|---|---|---|---|---|
| 01aa | AA TERMINAL, TOKYO BUSINESS OFFICE, JAPAN | ONLINE (TRANSMISSION IS ENABLED) | 2009.11.10.13:40 | 1.2.1.3 |
| 01ab | AB TERMINAL, TOKYO BUSINESS OFFICE, JAPAN | OFFLINE | 2009.11.09.12:00 | 1.2.1.4 |
| ... | ... | ... | ... | ... |
| 01ba | BA TERMINAL, OSAKA BUSINESS OFFICE, JAPAN | ONLINE (TEMPORARY HALTED) | 2009.11.10.13:45 | 1.2.2.3 |
| 01bb | BB TERMINAL, OSAKA BUSINESS OFFICE, JAPAN | ONLINE (TRANSMISSION IS ENABLED) | 2009.11.10.13:50 | 1.2.2.4 |
| ... | ... | ... | ... | ... |
| 01ca | CA TERMINAL, NEW YORK BUSINESS OFFICE, USA | OFFLINE | 2009.11.10.12:45 | 1.3.1.3 |
| 01cb | CB TERMINAL, NEW YORK BUSINESS OFFICE, USA | ONLINE (IN TRANSMISSION) | 2009.11.10.13:55 | 1.3.1.4 |
| ... | ... | ... | ... | ... |
| 01da | DA TERMINAL, WASHINGTON BUSINESS OFFICE, USA | ONLINE (IN TRANSMISSION) | 2009.11.08.12:45 | 1.3.2.3 |
| 01db | DB TERMINAL, WASHINGTON BUSINESS OFFICE, USA | OFFLINE | 2009.11.10.12:45 | 1.3.2.4 |
| ... | ... | ... | ... | ... |

FIG.14

DESTINATION LIST MANAGEMENT TABLE

| REQUEST ORIGIN TERMINAL ID | DESTINATION TERMINAL ID |
|---|---|
| 01aa | 01ab, ⋯, 01ba, 01bb, ⋯, 01ca, 01cb, 01da, 01db, ⋯ |
| 01ab | 01aa, 01ca, 01cb |
| 01ba | 01aa, 01ab, 01ca, 01cb, 01da, 01db |
| ⋯ | ⋯ |
| 01db | 01aa, 01ab, 01ba, ⋯, 01da, 01ca, 01cb, ⋯, 01da |

FIG.15

SESSION MANAGEMENT TABLE

| SELECTION SESSION ID | RELAYING APPARATUS ID | REQUEST ORIGIN TERMINAL ID | DESTINATION TERMINAL ID | DELAY TIME [ms] | DELAY INFORMATION RECEIVING DATE |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ⋯ | ⋯ | ⋯ | ⋯ | ⋯ | ⋯ |

FIG.16

ADDRESS PRIORITY MANAGEMENT TABLE

| SAME/DIFFERENT IN DOT ADDRESS | ADDRESS PRIORITY |
|---|---|
| SAME.SAME.SAME.DIFFERENT | 5 |
| SAME.SAME.DIFFERENT.- | 3 |
| SAME.DIFFERENT.-.- | 1 |
| DIFFERENT.-.-.- | 0 |

FIG.17

TRANSMISSION SPEED PRIORITY MANAGEMENT TABLE

| MAXIMUM DATA TRANSMISSION SPEED AT RELAYING APPARATUS [Mbps] | TRANSMISSION SPEED PRIORITY |
|---|---|
| 1000 OR MORE | 5 |
| FROM 100 TO 1000 | 3 |
| FROM 10 TO 100 | 1 |
| LESS THAN 10 | 0 |

FIG.18

QUALITY MANAGEMENT TABLE

| DELAY TIME [ms] | IMAGE QUALITY OF IMAGE DATA (QUALITY OF IMAGE) |
|---|---|
| FROM 0 TO 100 | HIGH IMAGE QUALITY |
| FROM 100 TO 300 | MEDIUM IMAGE QUALITY |
| FROM 300 TO 500 | LOW IMAGE QUALITY |
| 500 OR MORE | (HALTED) |

FIG.23

| RELAYING APPARATUS ID | ADDRESS PRIORITY | | POINT OF TRANSMISSION SPEED PRIORITY | TOTAL POINT |
|---|---|---|---|---|
| | POINT WITH RESPECT TO TERMINAL 10aa | POINT WITH RESPECT TO TERMINAL 10db | | |
| 111a | 5 | 1 | 3 | 8 |
| 111b | 3 | 1 | 5 | 8 |
| 111c | - | - | - | - |
| 111d | 1 | 5 | 1 | 6 |

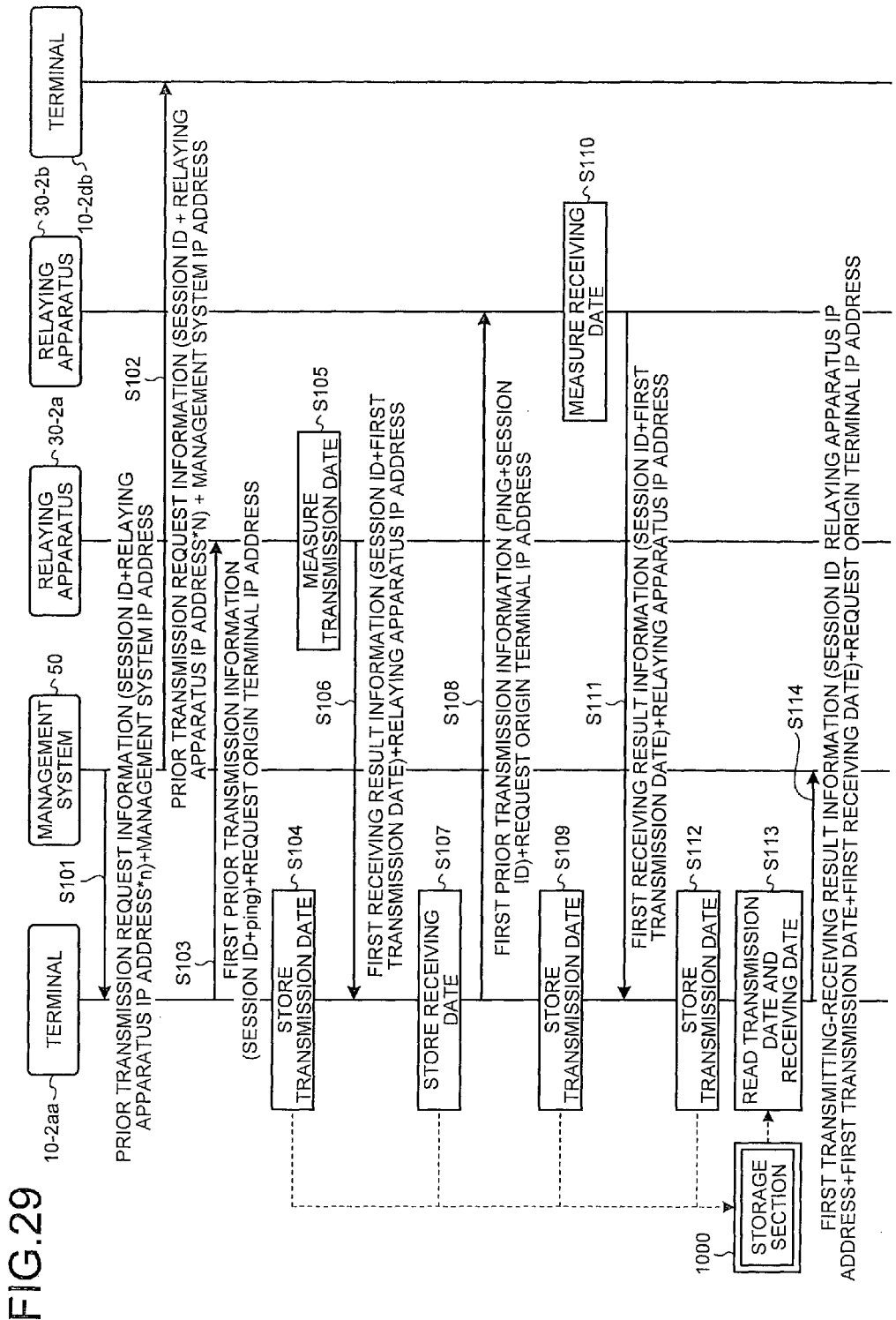

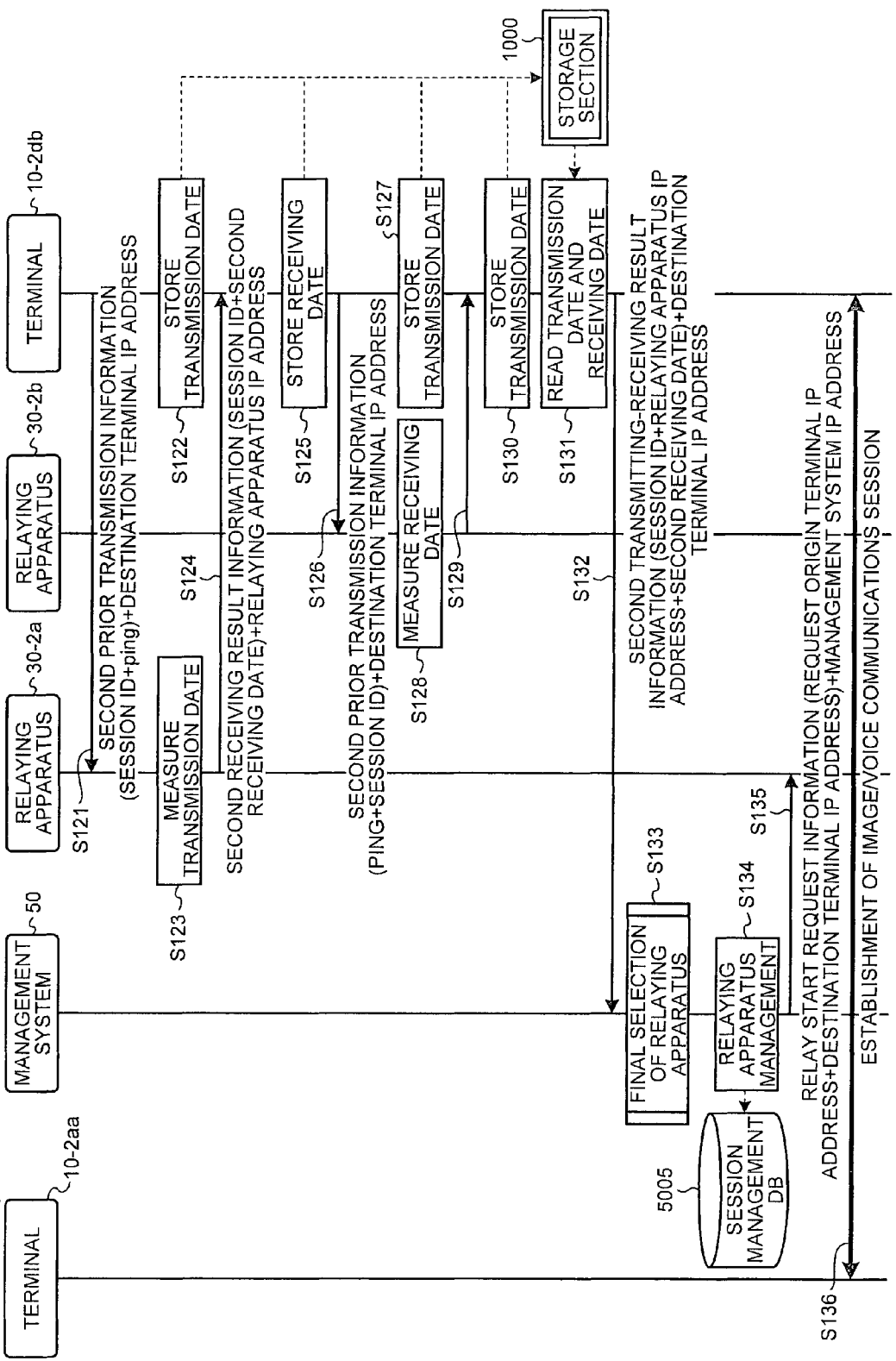

TRANSMISSION MANAGEMENT SYSTEM, TRANSMISSION SYSTEM, SELECTION METHOD, PROGRAM PRODUCT, PROGRAM SUPPLY SYSTEM, AND MAINTENANCE SYSTEM

TECHNICAL FIELD

The present invention relates to an invention for relaying content data for conversations among a plurality of transmission terminals.

BACKGROUND ART

One of the examples of a transmission system that transmits and receives content data among a plurality of transmission terminals is a television conference system in which a television conference is held through a communications network such as the Internet. The need for such a television conference system has been increasing because of the recent demand for reduction in cost and time taken for business trips. In such a television conference system, a plurality of television conference terminals, which are examples of the transmission terminals, are used. A television conference can proceed by transmitting and receiving image data and voice data among the television conference terminals.

Recent improvement of the broadband environment enables image data of high image quality and voice data of high sound quality to be transmitted and received. As a result, a state of the other party in a television conference can be easily grasped and communication in conversations can be improved.

When many television conferences are held through a communications network, or when image data and voice data are received by using a narrow bandwidth path on the communications network, a problem arises in that a delay occurs in receiving content data such as the image data and the voice data. It is generally said that users of the television conference system feel stress in conversations if a delay of 0.5 seconds or more occurs in receiving the content data. Because of such stress due to a delay, the users cannot proceed with the television conferences satisfactorily even in the recent improved broadband environment.

In recent television conference systems, a plurality of relaying apparatuses, which relay image data and voice data between the television conference terminals, are installed for each LAN (Local Area Network) in the communications network. The relaying apparatuses decentralize communications processing in a television conference so as to reduce the load of each relaying apparatus, and decentralize the data transmission amount of the content data to be relayed.

Conventionally, when one of the relaying apparatuses is selected and used, the relaying apparatus connected to the LAN to which the television conference terminal used for the television conference is connected is used. That is, the relaying apparatus having an IP address similar to the IP address of the television conference terminal is selected, and high quality content data can be transmitted and received through the selected relaying apparatus (refer to Japanese Patent Application Laid-open No. 2008-227577).

The conventional television conference systems, however, do not always fit the actual environment of the communications network because the relaying apparatus is selected on the assumption that high quality content data could be transmitted and received by using the relaying apparatus having the IP address similar to the IP address of the television conference terminal. Even if the IP addresses of the television conference terminal and the relaying apparatus are preliminarily obtained, it is difficult to grasp the connection conditions of the communications network spreading all over the world. The assumption is not always true due to the presence of disconnections in the actual conditions of the communications network, for example. As a result, a problem arises in that the relaying apparatus that relays high quality content data in the shortest period of time is not always selected under the actual environment of the communications network.

DISCLOSURE OF INVENTION

A transmission management system selects a relaying apparatus to actually relay content data between a first terminal and a second terminal, from a plurality of relay apparatuses capable of relaying the content data for conversation between the first and second terminals. The management system includes a receiving unit that receives a first transmission time information and a first receiving time information before the content data is transmitted and received between the first and second terminals. The first transmission time information indicates a transmission time point when prior transmission information is transmitted from the first terminal. The first receiving time information indicates a receiving time point when the prior transmission information is received at the second terminal. The prior transmission information is relayed by each of the relaying apparatuses after transmitted from the first terminal before received at the second terminal. The management system further includes a calculating unit that calculates a first necessary time period from when the first terminal transmits the prior transmission information to when the second terminal receives the prior transmission information, on the basis of a time difference between the receiving time point indicated by the first receiving time information and the transmission time point indicated by the first transmission information, for each relay apparatus through which the prior transmission information is relayed. The management system further includes a selecting unit that selects the relay apparatus through which the prior transmission information is relayed with a minimum first necessary time period, from among the plurality of relaying apparatuses.

In the aforementioned transmission management system, the first transmission time information may be contained in the prior transmission information transmitted from the first terminal to the second terminal, and the receiving unit may receive the first transmission time information and the first receiving time information from the second terminal.

In the aforementioned transmission management system, the receiving unit may receive a second transmission time information and a second receiving time information before the content data is transmitted and received between the first and second terminals. The second transmission time information indicates a transmission time point when prior transmission information is transmitted from the second terminal. The second receiving time information indicates a receiving time point when the prior transmission information is received at the first terminal. The prior transmission information is relayed by each of the relaying apparatuses after transmitted from the second terminal before received at the first terminal. In this case, the calculating unit may calculate a second necessary time period from when the second terminal transmits the prior transmission information to when the first terminal receives the prior transmission information, on the basis of a time difference between a receiving time point indicated by the second receiving time information and a transmission time point indicated by the second transmission time information, for each relay apparatus through which the prior transmission information is relayed. The calculating unit may further calculate a total necessary time period which is a sum of the first necessary time period and the second necessary time period. In this case, the selecting unit may select the relay apparatus through which the prior transmission information is relayed with a minimum total necessary time period, from among the plurality of relaying apparatuses.

In the aforementioned transmission management system, the second transmission time information may be contained in the prior transmission information transmitted from the second terminal to the first terminal, and the receiving unit may receive the second transmission time information and the second receiving time information from the first terminal.

A transmission system includes the first terminal, the second terminal, and the aforementioned transmission management system.

A selection method selects a relaying apparatus to actually relay content data between a first terminal and a second terminal, from a plurality of relay apparatuses capable of relaying the content data for conversation between the first and second terminals. The selection method includes receiving a first transmission time information and a first receiving time information before the content data is transmitted and received between the first and second terminals. The first transmission time information indicates a transmission time point when prior transmission information is transmitted from the first terminal. The first receiving time information indicates a receiving time point when the prior transmission information is received at the second terminal. The prior transmission information is relayed by each of the relaying apparatuses after transmitted from the first terminal before received at the second terminal. The selection method further includes calculating a first necessary time period from when the first terminal transmits the prior transmission information to when the second terminal receives the prior transmission information, on the basis of a time difference between the receiving time point indicated by the first receiving time information and the transmission time point indicated by the first transmission information, for each relay apparatus through which the prior transmission information is relayed. The selection method further includes selecting the relay apparatus through which the prior transmission information is relayed with a minimum first necessary time period, from among the plurality of relaying apparatuses.

A computer program product comprises a non-transitory computer-readable medium having computer-readable program codes embodied in the medium. The program codes when executed cause the transmission management system to function as each unit of the aforementioned transmission management system.

A program supply system supplies the program codes of the computer program product to the transmission management system through a communications network.

A maintenance system performs maintenance of the aforementioned transmission management system.

BRIEF DESCRIPTION OF DRAWINGS

FIG. 2 is a conceptual view illustrating a state of transmitting and receiving of image data, voice data, and various types of management information in the transmission system;

FIGS. 3A to 3C are conceptual views explaining image quality of the image data;

FIG. 10 is a conceptual view illustrating a quality change management table;

FIG. 11 is a conceptual view illustrating a relaying apparatus management table;

FIG. 12 is a conceptual view illustrating a terminal authentication management table;

FIG. 13 is a conceptual view illustrating a terminal management table;

FIG. 14 is a conceptual view illustrating a destination list management table;

FIG. 15 is a conceptual view illustrating a session management table;

FIG. 16 is a conceptual view illustrating an address priority management table;

FIG. 17 is a conceptual view illustrating a transmission speed priority management table;

FIG. 18 is a conceptual view illustrating a quality management table;

FIG. 23 is a schematic illustrating calculated points of priorities when the filtering processing to select the relaying apparatuses is performed;

FIG. 29 is a sequence diagram illustrating processing in which the terminal selects the relaying apparatus according to the second embodiment; and FIG. 30 is a sequence diagram illustrating processing in which the terminal selects the relaying apparatus according to the second embodiment.

BEST MODE(S) FOR CARRYING OUT THE INVENTION

Embodiments of the present invention are described below with reference to the accompanying drawings.

Overall Structure of an Embodiment

Figure 1:
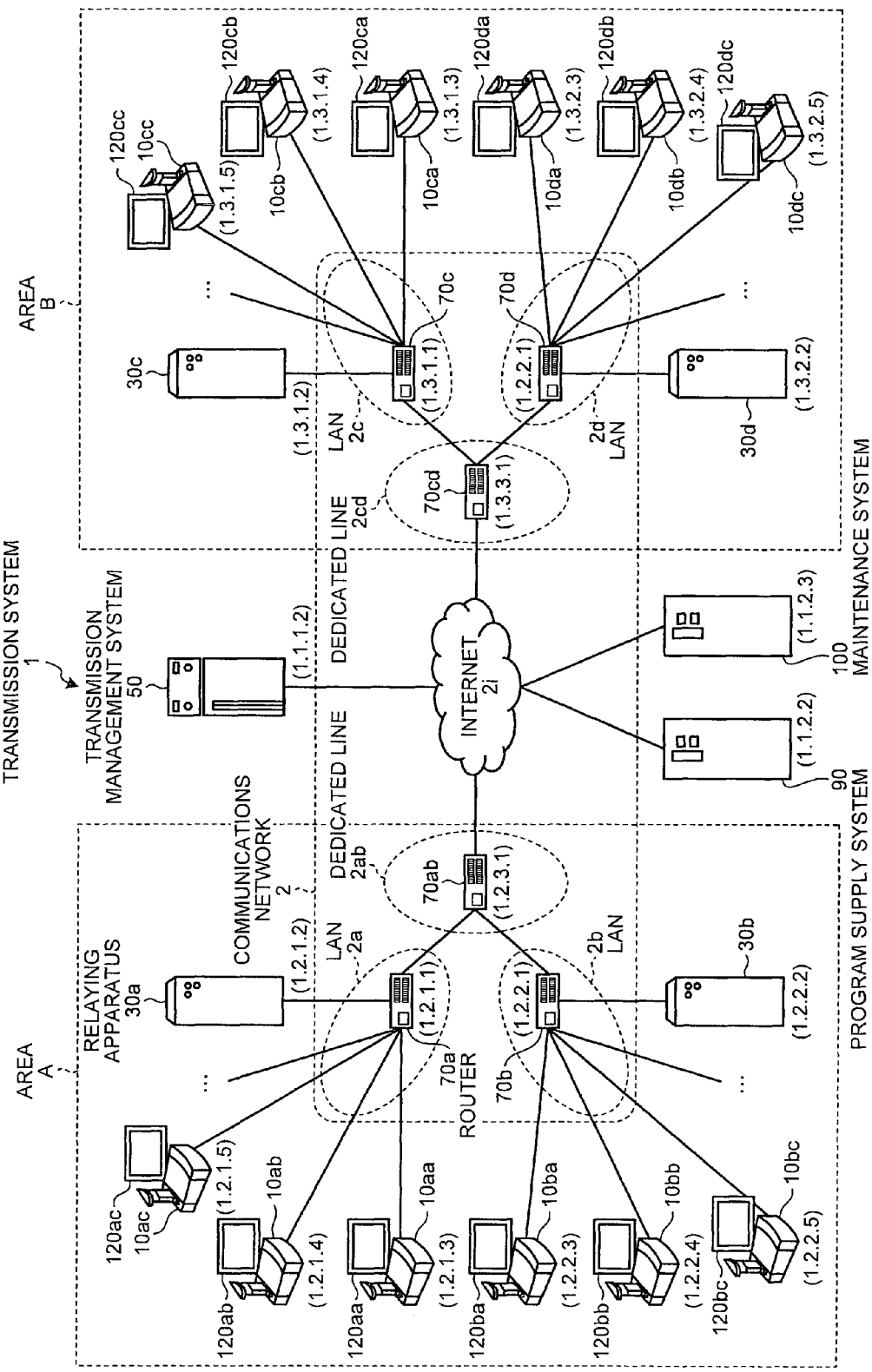
FIG. 1 is a schematic of a transmission system according to a first embodiment.

A first embodiment is described below with reference to FIGS. 1 to 27. FIG. 1 is a schematic of a transmission system 1 according to the first embodiment. FIG. 2 is a conceptual view illustrating a state of transmitting and receiving of image data, voice data, and various types of management information in the transmission system. FIGS. 3A to 3C are conceptual views explaining image quality of the image data.

The transmission system includes a data supply system in which content data is transmitted from a transmission terminal on one side to another transmission terminal on the other side through a transmission management system in one direction and a communication system in which information and feelings, for example, are mutually transmitted among a plurality of transmission terminals through the transmission management system. The communication system is a system in which information and feelings are mutually transmitted between a plurality of communication terminals through a communication management system. Examples of the communication system include a television conference system and a television telephone system.

In the embodiment, the transmission system, the transmission management system, and the transmission terminal are described on the assumption of the television conference system as an example of the communication system, a television conference management system as an example of the communication management system, and a television conference terminal as an example of the communication terminal. That is, the transmission terminal and the transmission management system of the present invention are applicable to not only the television conference system but also the communication system or a transmission system. The term "television conference", which is described in the embodiment, may be called as a "video conference". Both are used as the same meaning.

The transmission system 1 illustrated in FIG. 1 includes a plurality of transmission terminals (10aa, 10ab, . . . ), displays (120aa, 120ab, . . . ) for the respective transmission terminals (10aa, 10ab, . . . ), a plurality of relaying apparatuses (30a, 30b, 30c, and 30d), a transmission management system 50, a program supply system 90, and a maintenance system 100.

The transmission terminals 10 perform transmission by transmitting and receiving image data and voice data, which are examples of content data.

Hereinafter, the "transmission terminal" is simply expressed as the "terminal" while the "transmission management system" is simply expressed as the "management system". An arbitrary terminal among the terminals (10aa, 10ab, . . . ) is expressed as the "terminal 10". An arbitrary display among the displays (120aa, 120ab, . . . ) is expressed as a "display 120". An arbitrary relaying apparatus among the relaying apparatuses (30a, 30b, 30c, and 30d) is expressed as a "relaying apparatus 30". A terminal that requests a start of a television conference as a request origin is described as a "request origin terminal" and another terminal that is a destination of the request (relay destination) is described as a "destination terminal".

As illustrated in FIG. 2, in the transmission system 1, a management information session "sei" for transmitting and receiving various types of management information is established between the request origin terminal and the destination terminal through the management system 50. In addition, between the request origin terminal and the destination terminal, four sessions are established for transmitting and receiving four pieces of high resolution image data, medium resolution image data, low resolution image data, and voice data through the relaying apparatus 30. In the embodiment, the four sessions are collectively described as an image/voice data session "sed".

A resolution of an image represented by the image data in the embodiment is described below. The image includes a low resolution image that is composed of 160 pixels horizontally and 120 pixels vertically as illustrated in FIG. 3A and serves as a base image, a medium resolution image composed of 320 pixels horizontally and 240 pixels vertically as illustrated in FIG. 3B, and a high resolution image composed of 640 pixels horizontally and 480 pixels vertically as illustrated in FIG. 3C. Among them, when the image data is transmitted through a narrow bandwidth path, low image quality image data including only low resolution image data serving as the base image is relayed. When the bandwidth is relatively wide, medium image quality image data composed of the low resolution image data serving as the base image and image data including medium resolution image data is relayed. When the bandwidth is very wide, high image quality image data including the low resolution image data serving as the base image, the medium resolution image data, and high resolution image data is relayed. For example, in a quality change management table illustrated in FIG. 10, when the relaying apparatus 30 relays the image data to the destination terminal 10db having an IP address "1.3.2.4", the image quality (quality of image) of the image data to be relayed is "high quality".

The relaying apparatus 30 illustrated in FIG. 1 relays content data among the terminals 10. The management system 50 collectively or integrally manages a login authentication from the terminal 10, a telephone conversation state of the terminal 10, a destination list, and a communications state of the relaying apparatus 30, for example. Images represented by the image data may be moving images or still images, or both moving and still images.

A plurality of routers (70a, 70b, 70c, 70d, 70ab, and 70cd) select optimal routes for image data and voice data. In the embodiment, an arbitrary router among the routers (70a, 70b, 70c, 70d, 70ab, and 70cd) is expressed as a "router 70".

The program supply system 90 includes an HD (Hard Disk) 204, which is described layer. A terminal program enabling the terminal 10 to realize various functions (or to function as various types of units) is stored in the HD 204. The program supply system 90 can transmit the terminal program to the terminal 10. In addition, the program supply system 90 stores a relaying apparatus program enabling the relaying apparatus 30 to realize various functions (or to function as various types of units) in the HD 204 and can transmit the relaying apparatus program to the relaying apparatus 30. Furthermore, the program supply system 90 stores a transmission management program enabling the management system 50 to realize various functions (or to function as various types of units) in the HD 204 and can transmit the transmission management program to the management system 50.

The maintenance system 100 is a computer that performs maintenance management or maintenance of the terminal 10, the relaying apparatus 30, the management system 50 or the program supply system 90. For example, when the maintenance system 100 is installed domestically while the terminal 10, the relaying apparatus 30, the management system 50 or the program supply system 90 is installed overseas, the maintenance system 100 remotely performs the maintenance management or the maintenance of the terminal 10, the relaying apparatus 30, the management system 50 or the program supply system 90 through a communications network 2. The maintenance system 100 also performs the maintenance, such as the management of a model number, a product serial number, a sale destination, maintenance and inspection, or a failure history, of at least one of the terminal 10, the relaying apparatus 30, the management system 50 and the program supply system 90 without using the communications network 2.

The terminals (10aa, 10ab, 10ac, ...), the relaying apparatus 30a, and the router 70a are coupled to each other with a LAN 2a so as to enable communications among them. The terminals (10ba, 10bb, 10bc, ...), the relaying apparatus 30b, and the router 70b are coupled to each other with a LAN 2b so as to enable communications among them. The LANs 2a and 2b are coupled to each other with a dedicated line 2ab including the router 70ab so as to enable communications among them, and structured in a predetermined area A. For example, the area A is Japan and the LAN 2a is structured in a business office in Tokyo while the LAN 2b is structured in a business office in Osaka.

The terminals (10ca, 10cb, 10cc, ...) the relaying apparatus 30c, and the router 70c are coupled to each other with a LAN 2c so as to enable communications among them. The terminals (10da, 10db, 10dc, ...), the relaying apparatus 30d, and the router 70d are coupled to each other with a LAN 2d so as to enable communications among them. The LANs 2c and 2d are coupled to each other with a dedicated line 2cd including the router 70cd so as to enable communications among them, and structured in a predetermined area B. For example, the area B is the United States of America and the LAN 2c is structured in a business office in New York while the LAN 2d is structured in a business office in Washington, D.C. The areas A and B are coupled to each other with the routers (70ab and 70cd) through the Internet 2i so as to enable communications therebetween.

The management system 50 and the program supply system 90 are coupled to each terminal 10 and each relaying apparatus 30 so as to enable the systems to perform communications with each terminal 10 and each relaying apparatus 30 through the Internet 2i. The management system 50 and the program supply system 90 may be disposed in the area A or the area B, or in any area other than the areas A and B.

In the embodiment, the communications network 2 of the embodiment is structured with the LANs 2a and 2b, the dedicated lines 2ab and 2cd, the Internet 2i, and the LANs 2c and 2d. The communications network 2 may include a section in which communications is performed wirelessly such as WiFi (Wireless Fidelity) or Bluetooth (registered trademark) besides the wired transmission.

In FIG. 1, four numbers indicated under each terminal 10, each relaying apparatus 30, the management system 50, each router 70, and the program supply system 90 simply represent commonly used IP addresses in IPv4. For example, the IP address of the terminal 10aa is "1.2.1.3". The IPv6 may be used instead of IPv4. However, the explanation is made by using IPv4 for simple explanation.

Each terminal 10 may be used together in a telephone conversation made in the same room, or in a telephone conversation made between an outdoor site and an indoor site or among the outdoor sites in addition to a telephone conversation made among a plurality of business offices and a telephone conversation made among different rooms in the same business office. When each terminal 10 is used at an outdoor site, communications is performed wirelessly such as a cellular phone communications network.

<<Hardware Structure of the Embodiment>>

A hardware structure of the embodiment is described below. In the embodiment, a case is described in which a delay occurs in receiving of image data performed by the terminal 10 serving as a destination (relay destination), the resolution of an image represented by image data is changed by the relaying apparatus 30, and thereafter the resulting image data is transmitted to the terminal 10 serving as the relay destination.

Figure 4:
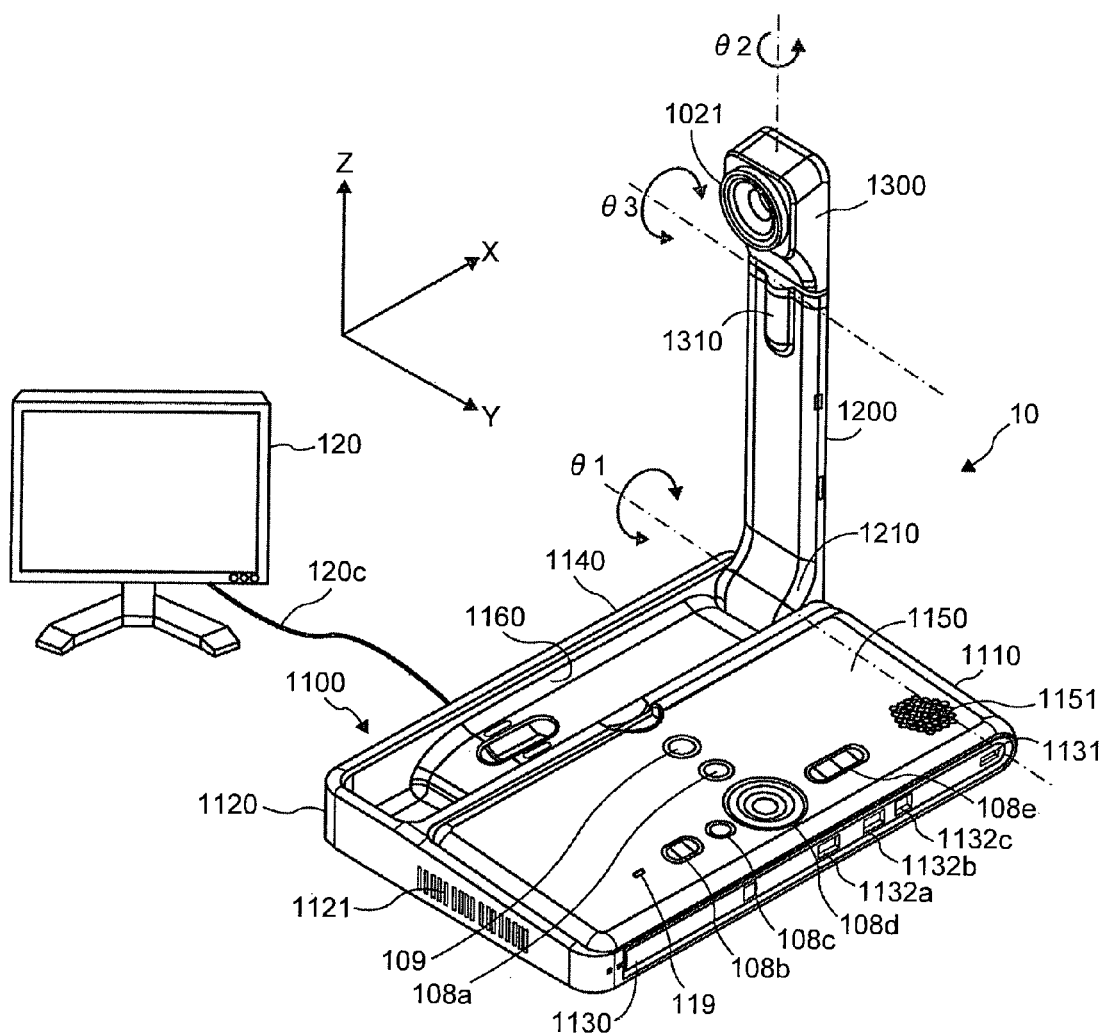
FIG. 4 is an external view of a terminal according to the first embodiment.

FIG. 4 is an external view of the terminal 10 according to the embodiment. In the following description, a longitudinal direction of the terminal 10 is defined as an X-axis direction, a direction perpendicular to the X-axis direction in a horizontal plane is defined as a Y-axis direction, and a direction perpendicular to the X-axis and Y-axis directions (vertical direction) is defined as a Z-axis direction.

As illustrated in FIG. 4, the terminal 10 includes a housing 1100, an arm 1200, and a camera housing 1300. A front sidewall surface 1110 of the housing 1100 includes an air intake surface (not illustrated) having a plurality of air intake holes. A rear sidewall surface 1120 of the housing 1100 includes an air exhaust surface 1121 having a plurality of air exhaust holes. As a result, external air at the front of the terminal 10 can be taken in through the air intake surface (not illustrated) and the taken air can be exhausted toward the rear of the terminal 10 through the air exhaust surface 1121. A right sidewall surface 1130 of the housing 1100 has a sound-collecting hole 1131. The sound-collecting hole 1131 enables a built-in microphone 114, which is described later, to collect sounds such as voices, other sounds, and noises.

An operation panel 1150 is formed on a side adjacent to the right sidewall surface 1130 of the housing 1100. The operation panel 1150 is provided with a plurality of operation buttons (108a to 108e), a power source switch 109, and an alarm lamp 119, which are described later, and includes a sound output surface 1151 having a plurality of voice output holes through which output sound from a built-in speaker 115, which is described later, passes. In addition, a housing section 1160 is formed in a recess so as to house the arm 1200 and the camera housing 1300, on a side adjacent to a left sidewall surface 1140 of the housing 1100. The right sidewall surface 1130 of the housing 1100 is provided with a connecting ports (1132a to 1132c) for electrically connecting cables to an external device connection I/F 118, which is described later. On the other hand, the left sidewall surface 1140 of the housing 1100 is provided with a connecting port (not illustrated) for electrically connecting a cable 120c for a display 120 to the external device connection I/F 118, which is described later.

In the following description, an arbitrary operation button among the operation buttons (108a to 108e) is expressed as an "operation button 108" while an arbitrary connecting port among the connecting ports (1132a to 1132c) is expressed as a "connecting port 1132".

The arm 1200 is mounted on the housing 1100 with a torque hinge 1210 such that the arm 1200 is rotatable with respect to the housing 1100 in the up-down direction within a range of a tilt angle θ1 of 135 degrees. FIG. 4 illustrates the state when the tilt angle θ1 is 90 degrees.

The camera housing 1300 includes a built-in camera 112, which is described later. The camera 112 can be used to image a user, a document, and a room, for example. The camera housing 1300 has a torque hinge 1310. The camera housing 1300 is mounted on the arm 1200 with the torque hinge 1310. The camera housing 1300 is mounted on the arm 1200 with the torque hinge 1310 such that the camera housing 1300 is rotatable with respect to the arm 1200 in the up-down and left-right directions within a range of a pan angle θ2 of ±180 degrees when the angle is 0 degrees in the state illustrated in FIG. 4 and within a range of a tilt angle θ3 of ±45 degrees.

The relaying apparatus 30, the management system 50, the program supply system 90, and the maintenance system 100 have the same outer appearances as those of typical servers and computers. The description of their outer appearances is thus omitted.

Figure 5:
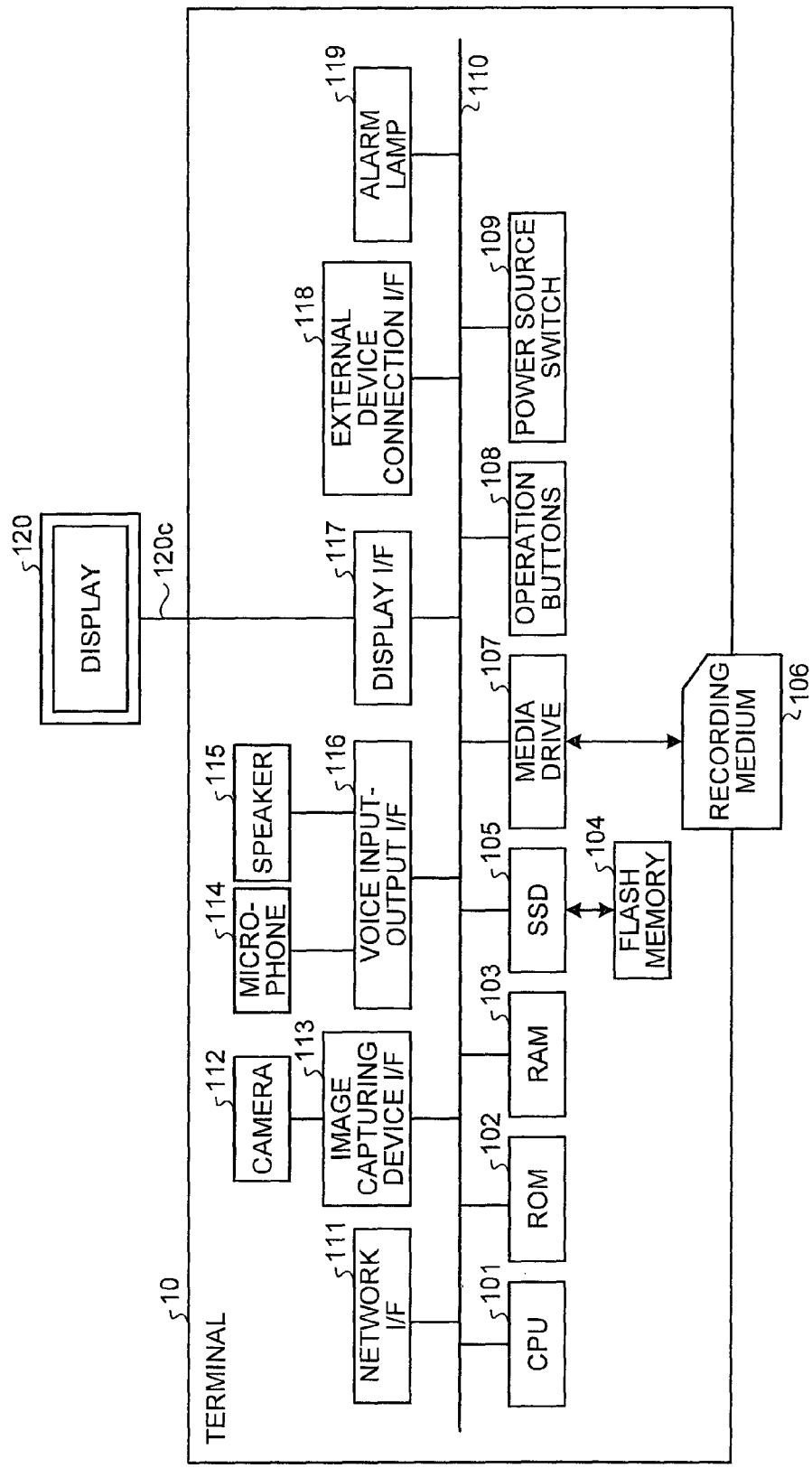
FIG. 5 is a schematic illustrating a hardware structure of the terminal according to the first embodiment.

FIG. 5 is a schematic illustrating a hardware structure of the terminal 10 according to the embodiment. As illustrated in FIG. 5, the terminal 10 of the embodiment includes a CPU (Central Processing Unit) 101 that controls overall operation of the terminal 10, a ROM (Read Only Memory) 102 that stores therein a program used to drive the CPU 101 such as an IPL (Initial Program Loader), a RAM (Random Access Memory) 103 used as a working area of the CPU 101, a flash memory 104 that stores therein various types of data such as the terminal program, the image data, and the voice data, and an SSD (Solid State Drive) 105 that controls reading of various types of data from or writing various types of data into the flash memory 104 under the control of the CPU 101, a media drive 107 that controls reading of data from or writing (storing) of data into a recording medium 106 such as a flash memory, the operation buttons 108 operated when a destination of the terminal 10 is selected, for example, the power source switch 109 that switches between on and off of the power source of the terminal 10, and a network I/F (Interface) 111 that performs data transmission by utilizing the communications network 2.

The terminal 10 further includes the built-in camera 112 that images a subject and acquires the image data under the control of the CPU 101, an image capturing device I/F 113 that controls driving of the camera 112, the built-in microphone 114 that receives voices, the built-in speaker 115 that outputs voices, a voice input-output I/F 116 that processes input and output of a voice signal between the microphone 114 and the speaker 115 under the control of the CPU 101, a display I/F 117 that transmits image data to the display 120 externally mounted under the control of the CPU 101, the external device connection I/F 118 that connects various external devices, the alarm lamp 119 that alarms the abnormalities of the various functions of the terminal 10, and a bus line 110 that electrically connects the above-described components as illustrated in FIG. 5, such as an address bus or a data bus.

The display 120 includes a liquid crystal or organic EL by which images of subjects and operation icons, for example, are displayed. The display 120 is coupled to the display I/F 117 with the cable 120c. The cable 120c may be an analog RGB (VGA) signal cable, a component video cable, an HDMI (High-Definition Multimedia Interface) signal cable, or a DVI (Digital Video Interactive) signal cable.

The camera 112 includes a lens and a solid state image capturing device that converts light into charges so as to generate an electrically available image (picture) of a subject. As the solid state image capturing device, a CMOS (Complementary Metal Oxide Semiconductor) or a CCD (Charge Coupled Device) is used, for example.

External devices such as an external camera, an external microphone, and an external speaker can be electrically coupled to the external device connection I/F 118 with USB (Universal Serial Bus) cables inserted into the connecting port 1132 of the housing 1100 illustrated in FIG. 4. When an external camera is coupled, the external camera is driven prior to the built-in camera 112 under the control of the CPU 101. Likewise, when an external microphone and an external speaker are coupled, the external microphone and the external speaker are driven prior to the built-in microphone 114 and the built-in speaker 115 under the control of the CPU 101.

The recording medium 106 is attachable to and detachable from the terminal 10. An EEPROM (Electrically Erasable and Programmable ROM) may be used, for example, as a non-volatile memory from which data is read or into which data is written under the control of the CPU 101. The non-volatile memory is not limited to the flash memory 104.

The terminal program may be recorded into a computer readable recording medium such as the recording medium 106 in an installable format or an executable format and distributed. The terminal program may be stored in the ROM 102 instead of the flash memory 104.

Figure 6:
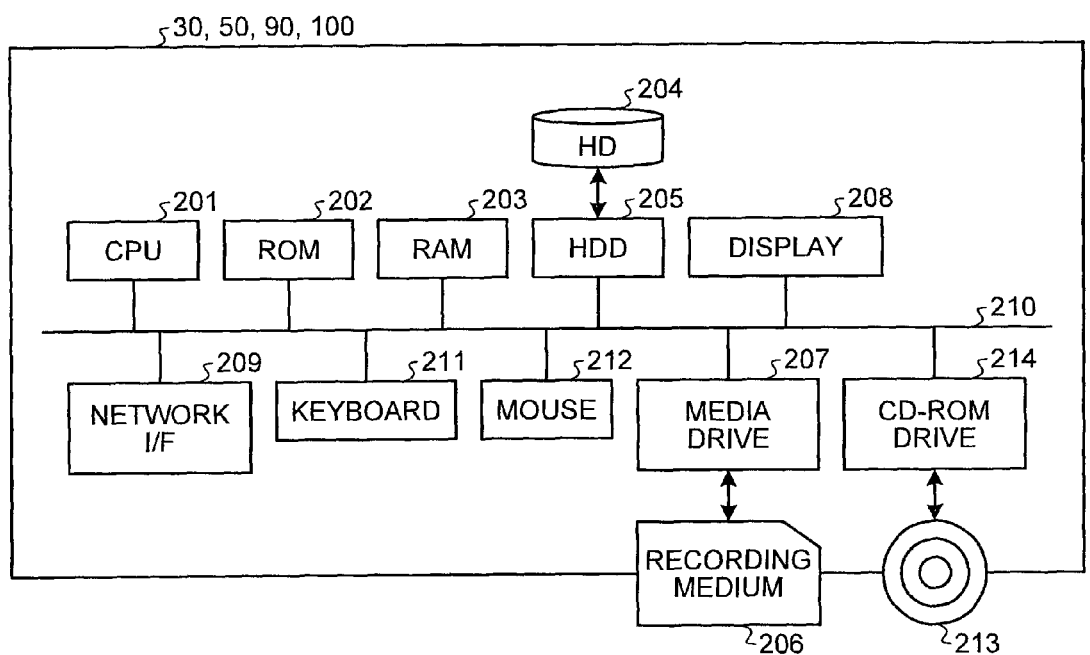
FIG. 6 is a schematic illustrating a hardware structure of a management system, a relaying apparatus, or a program supply server according to the first embodiment.

FIG. 6 is a schematic illustrating a hardware structure of the management system according to the embodiment. The management system 50 includes a CPU 201 that controls the overall operation of the management system 50, a ROM 202 that stores therein a program used to drive the CPU 201 such as an IPL, a RAM 203 used as a working area of the CPU 201, the HD 204 that stores therein various types of data such as the transmission management program, an HDD (Hard Disk Drive) 205 that controls reading of various types of data from or writing of various types of data into the HD 204 under the control of the CPU 201, a media drive 207 that controls reading data from or writing (storing) data into a recording medium 206 such as a flash memory, a display 208 that displays various types of information such as a cursor, menus, windows, characters, and images, a network I/F 209 that performs data transfer by utilizing the communications network 2, a keyboard 211 that is provided with a plurality of keys to input characters, numerical values, and various instructions, a mouse 212 that is used to select and execute various instructions, select items to be processed, and move the cursor, a CD-ROM drive 214 that controls reading of various types of data from or writing of various types of data into a CD-ROM (Compact Disc Read Only Memory) 213 as an example of an attachable-detachable recording medium, and a bus line 210 that electrically connects the above-described elements as illustrated in FIG. 6, such as an address bus or a data bus.

The transmission management program may be recorded into a computer readable recording medium such as the recording medium 206 or the CD-ROM 213 in an installable format or an executable format and distributed. The transmission management program may be stored in the ROM 202 instead of the HD 204.

The relaying apparatus 30 has the same hardware structure as that of the management system 50. The description thereof is thus omitted. However, the HD 204 records the relaying apparatus program that controls the relaying apparatus 30. Also in this case, the relaying apparatus program may be recorded into a computer readable recording medium such as the recording medium 206 or the CD-ROM 213 in an installable format or an executable format and distributed. The relaying apparatus program may be stored in the ROM 202 instead of the HD 204.

The program supply system 90 and the maintenance system 100 have the same hardware structure as that of the management system 50. The description thereof is thus omitted. However, the HD 204 records a program supply program that controls the program supply system 90. Also in this case, the program supply system program may be recorded into a computer readable recording medium such as the recording medium 206 or the CD-ROM 213 in an installable format or an executable format and distributed. The program supply system program may be stored in the ROM 202 instead of the HD 204.

The programs may be recorded into a computer readable recording medium such as a CD-R (computer Disc recordable), a DVD (digital Versatile Disk), or a Blue-ray disc as another example of the above-described attachable-detachable recording medium, and supplied.

<<Functional Structure of the Embodiment>>

Figure 7:
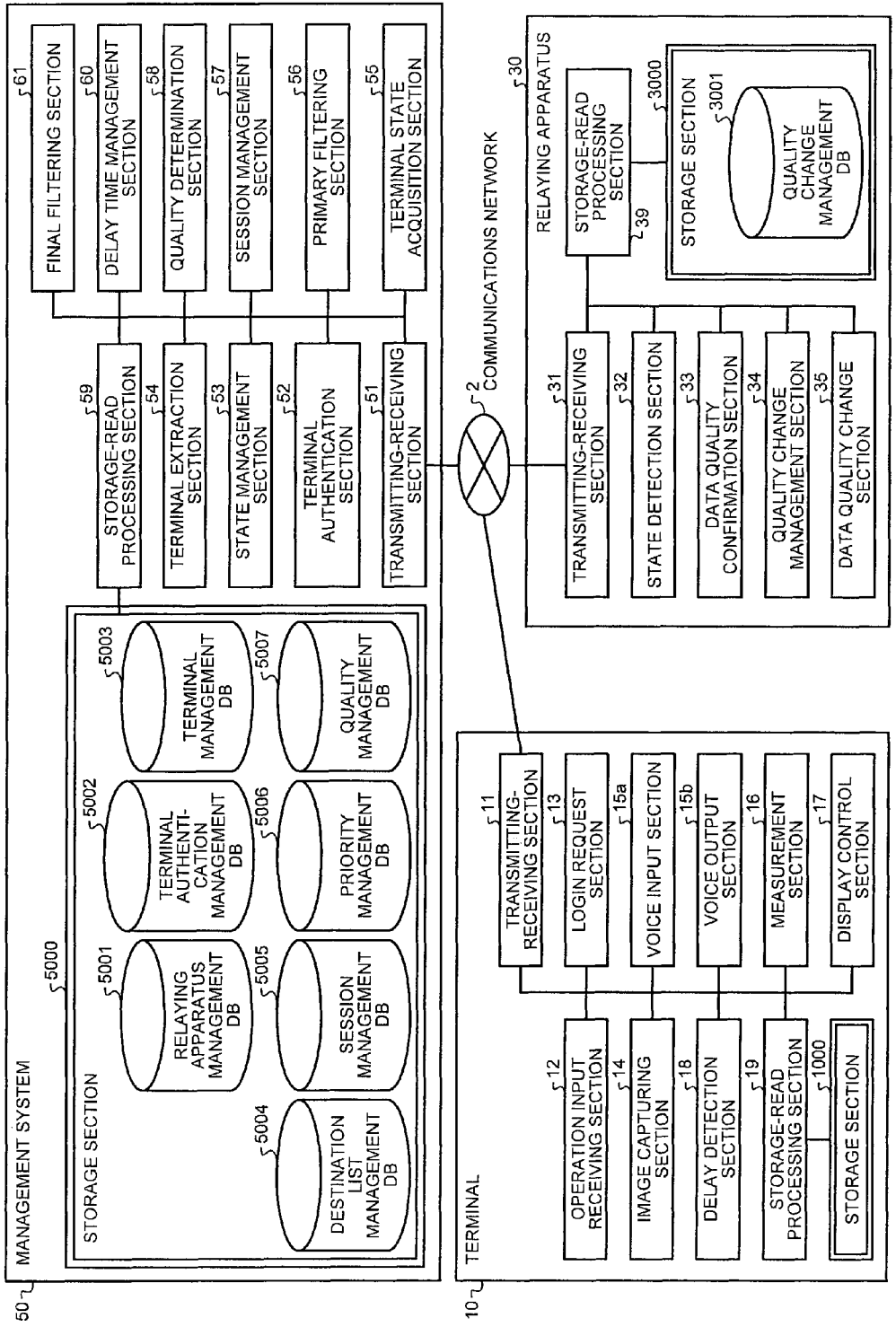
FIG. 7 is a functional block diagram of each terminal, each relaying apparatus, and the management system included in the transmission system according to the first embodiment.

A functional structure of the embodiment is described below. FIG. 7 is a functional block diagram of each terminal, each apparatus, and the system included in the transmission system 1 of the embodiment. In FIG. 7, the terminal 10, the relaying apparatus 30, and the management system 50 are coupled so as to enable data communications among them through the communications network 2. The program supply system 90 illustrated in FIG. 1 is omitted in FIG. 7 because the program supply system 90 does not directly relate to communications in a television conference.

<Functional Structure of Terminal>

The terminal 10 includes a transmitting-receiving section 11, an operation input receiving section 12, a login request section 13, an image capturing section 14, a voice input section 15a, a voice output section 15b, a measurement section 16, a display control section 17, a delay detection section 18, and a storage-read processing section 19. Each of the sections has a function that is achieved when any of the components illustrated in FIG. 5 are operated by commands from the CPU 101 in accordance with the terminal program loaded on the RAM 103 from the flash memory 104, or is a unit for performing the function. The terminal 10 includes a storage section 1000 structured by the RAM 103 and the flash memory 104 that are illustrated in FIG. 5.

(Each Functional Structure of Terminal)

Next, each functional structure of the terminal 10 is, described in detail. In the following description of each functional structure of the terminal 10, a relationship between each functional structure of the terminal 10 and major components that achieve each functional structure of the terminal 10 among the components illustrated in FIG. 5 is also described.

The transmitting-receiving section 11 of the terminal 10 is achieved by a command from the CPU 101 illustrated in FIG. 5 and the network I/F 111 illustrated in FIG. 5. The transmitting-receiving section 11 transmits and receives various types of data (information) between itself and the other terminals, apparatuses, or the system through the communications network 2. The transmitting-receiving section 11 starts receiving pieces of state information indicating the states of the respective terminals serving as destination candidates from the management system 50 before starting a telephone conversation with a desired destination terminal. The state information indicates not only the operation state of each terminal 10 (an online state or an offline state) but also a detailed state such as whether in the online state and a telephone conversation can be made, whether in a busy state, or whether a user is absent. In addition, the state information indicates not only the operation state of the terminal 10 but also other various states relating to the terminal 10. For example, a state in which the cable (120c, 130c, 140c, or 150c) is come off from the terminal 10, a state in which the terminal 10 outputs voices but no images, and a state in which the terminal 10 outputs no voices (MUTE). A case in which the state information indicates the operation state is described below as an example.

The operation input receiving section 12, which is achieved by a command from the CPU 101 illustrated in FIG. 5, and the operation buttons 108 and the power source switch 109 illustrated in FIG. 5, receives various types of inputs from a user. For example, once a user turns on the power source switch 109 illustrated in FIG. 5, the operation input receiving section 12 illustrated in FIG. 7 receives the power source on and causes the power source to be turned on.

The login request section 13, which is achieved by a command from the CPU 101 illustrated in FIG. 5, once the power source on is received, automatically transmits login request information indicating a request for a login and a current IP address of the request origin terminal to the management system 50 from the transmitting-receiving section 11 through the communications network 2. When the user switches the power source switch 109 from the on state to the off state, the operation input receiving section 12 completely turns off the power source after the transmitting-receiving section 11 transmits the state information indicating that the power source is to be turned off to the management system 50. As a result, the management system 50 can grasp the fact that the power source of the terminal 10 has been turned off from the on state.

The image capturing section 14, which is achieved by a command from the CPU 101 illustrated in FIG. 5 and the camera 112 and the image capturing device I/F 113 illustrated in FIG. 5, images a subject and outputs the resulting image data.

The voice input section 15a, which is achieved by a command from the CPU 101 illustrated in FIG. 5 and the voice input-output I/F 116 illustrated in FIG. 5, inputs voice data relating to a voice signal, after the microphone 140 converts a voice of a user into the voice signal. The voice output section 15b, which is achieved by a command from the CPU 101 illustrated in FIG. 5 and the voice input-output I/F 116 illustrated in FIG. 5, outputs a voice signal relating to voice data to a speaker so as to cause the speaker 150 to output a voice.

The measurement section 16 measures first receiving time (tr1) at which the transmitting-receiving section 11 receives first prior transmission information and second receiving time (tr2) at which the transmitting-receiving section 11 receives second prior transmission information. The first prior transmission information and the second prior transmission information include ping (Packet Internet Groper) for confirming that the relaying apparatus 30 and the terminals 10 that are the transmission origins of the prior transmission information are coupled so as to enable communications therebetween. The first prior transmission information is used for measuring a necessary period of time from the transmission of the first prior transmission information at the destination terminal serving as a first terminal to the reception of the first prior transmission information at the request origin terminal serving as a second terminal through the relaying apparatus 30 by being transmitted and received instead of image data and voice data prior to the transmission of the image data and the voice data. The second prior transmission information is used for measuring a necessary period of time from the transmission of the second prior transmission information at the request origin terminal serving as the second terminal to the reception of the second prior transmission information at the destination terminal serving as the first terminal through the relaying apparatus 30 by being transmitted and received instead of image data and voice data prior to the transmission of the image data and the voice data. The request origin terminal may be the first terminal while the destination terminal may be the second terminal.

The display control section 17, which is achieved by a command from the CPU 101 illustrated in FIG. 5 and the display I/F 117 illustrated in FIG. 5, performs control so as to combine received pieces of image data having different resolutions and transmit the combined image data to the display 120 as described later. The display control section 17 can transmit information indicating a destination list received from the management system 50 to the display 120 so as to cause the display 120 to display the destination list.

The delay detection section 18, which is achieved by a command from the CPU 101 illustrated in FIG. 5, detects delay time (ms) of image data or voice data transmitted from the other terminals 10 through the relaying apparatus 30.

The storage-read processing section 19, which is executed by a command from the CPU 101 illustrated in FIG. 5 and the SSD 105 illustrated in FIG. 5 or achieved by a command from the CPU 101, stores various types of data in the storage section 1000 or reads various types of data stored in the storage section 1000. The storage section 1000 stores therein a terminal ID (Identification) and a password for identifying the terminal 10, for example. In the storage section 1000, image data and voice data that are received when a telephone conversation is made with the destination terminal are stored and overwritten with new image data and voice data at every receiving of the data. In this regard, an image is displayed on the display 120 in accordance with the image data before being overwritten while a voice is output from the speaker 150 in accordance with, the voice data before being overwritten.

The terminal ID and a relaying apparatus ID, which is described later, of the embodiment indicate identification information used for uniquely identifying the terminal 10 and the relaying apparatus 30. For example, the identification information is languages, characters, symbols, or various signs. The terminal ID and the relaying apparatus ID may be the identification information obtained by combining at least two of the languages, characters, symbols, and various signs.

<Functional Structure of Relaying Apparatus>

The relaying apparatus 30 includes a transmitting-receiving section 31, a state detection section 32, a data quality confirmation section 33, a quality change management section 34, a data quality change section 35, and a storage-read processing section 39. Each of the sections has a function that is achieved when any of the components illustrated in FIG. 6 are operated by commands from the CPU 201 in accordance with the relaying apparatus program loaded on the RAM 203 from the HD 204, or is a unit for performing the function. The relaying apparatus 30 includes a storage section 3000 structured by the RAM 203 illustrated in FIG. 6 and/or the HD 204 illustrated in FIG. 6. FIG. 10 is a conceptual view illustrating a quality change management table.

(Quality Change Management Table)

In the storage section 3000, a quality change management DB (Data Base) 3001 having a quality change management table illustrated in FIG. 10 is structured. In the quality change management table, the IP address of the terminal 30 serving as the relay destination (destination) of image data and image quality of the image data to be relayed by the relaying apparatus 30 to the relay destination are managed in association with each other.

(Each Functional Structure of Relaying. Apparatus)

Next, each functional structure of the relaying apparatus 30 is described in detail. In the following description of each functional structure of the relaying apparatus 30, a relationship between each functional structure of the relaying apparatus 30 and major components that achieve each functional structure of the relaying apparatus 30 among the components illustrated in FIG. 6 is also described.

The transmitting-receiving section 31 of the relaying apparatus 30 illustrated in FIG. 7 is achieved by a command from the CPU 201 illustrated in FIG. 6 and the network I/F 209 illustrated in FIG. 6. The transmitting-receiving section 31 transmits and receives various types of data (information) between itself and the other terminals, apparatuses, or the system through the communications network 2.

The state detection section 32, which is achieved by a command from the CPU 201 illustrated in FIG. 6, detects the operation state of the relaying apparatus 30 including the state detection section 32. The operation state is the "online" state, the "offline" state, the "busy" state, or a "temporary halt" state.

The data quality confirmation section 33, which is achieved by a command from the CPU 201 illustrated in FIG. 6, searches the quality change management DB 3001 (refer to FIG. 10) by using the IP address of the destination terminal as a searching key, and extracts image quality of the image data to be relayed corresponding to the IP address, thereby confirming the image quality of the image data to be relayed. The description in the parenthesis after the DB3001 indicates the drawing in which the table structured in the DB3001 is illustrated. The description in the parenthesis after each DB means the same as that after the DB3001 in the following description.

The quality change management section 34, which is achieved by a command from the CPU 201 illustrated in FIG. 6, changes the content of the quality change management DB 3001 in accordance with quality information, which is described later, transmitted from the management system 50. For example, during a television conference held between the request origin terminal (terminal 10*aa*) having the terminal ID of "01*aa*" and the destination terminal (terminal 10*db*) having the terminal ID of "01*db*" by transmitting and receiving high image quality image data, when a delay occurs in receiving the image data in the destination terminal (terminal 10*db*) due to a start of another television conference held between the request origin terminal (terminal 10*bb*) and the destination terminal (terminal 10*db*) though the communications network 2, for example, the relaying apparatus 30 lowers the image quality of the image data, which has been relayed by the relaying apparatus 30, from high image quality to medium image quality. In such a case, the content of the quality change management DB 3001 is changed in accordance with the quality information indicating the medium quality so as to lower the image quality of the image data relayed by the relaying apparatus 30 from high quality to medium quality.

The data quality change section 35, which is achieved by a command from the CPU 201 illustrated in FIG. 6, changes the image quality of the image data transmitted from the transmission origin terminal 10 in accordance with the changed content of the quality change management DB 3001.

The storage-read processing section 39, which is achieved by a command from the CPU 201 illustrated in FIG. 6 and the HDD 205 illustrated in FIG. 6, stores various types of data in the storage section 3000 or read various types of data stored in the storage section 3000.

<Functional Structure of Management System>

The management system 50 includes a transmitting-receiving section 51, a terminal authentication section 52, a state management section 53, a terminal extraction section 54, a terminal state acquisition section 55, a primary filtering section 56, a session management section 57, a quality determination section 58, a storage-read processing section 59, a delay time management section 60, and a final filtering section 61. Each of the sections has a function that is achieved when any of the components illustrated in FIG. 6 is operated by commands from the CPU 201 in accordance with the management system program loaded on the RAM 203 from the HD 204, or is a unit for performing the function. The management system 50 includes a storage section 5000 structured by the HD 204 illustrated in FIG. 6.

Figure 8:
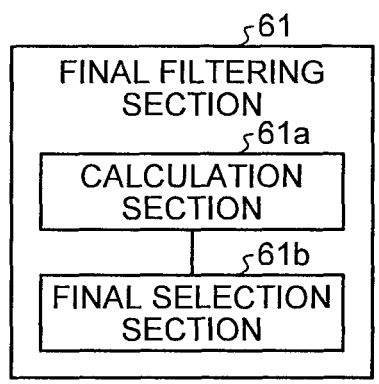
FIG. 8 is a schematic illustrating a functional structure of a final filtering section.
Figure 9:
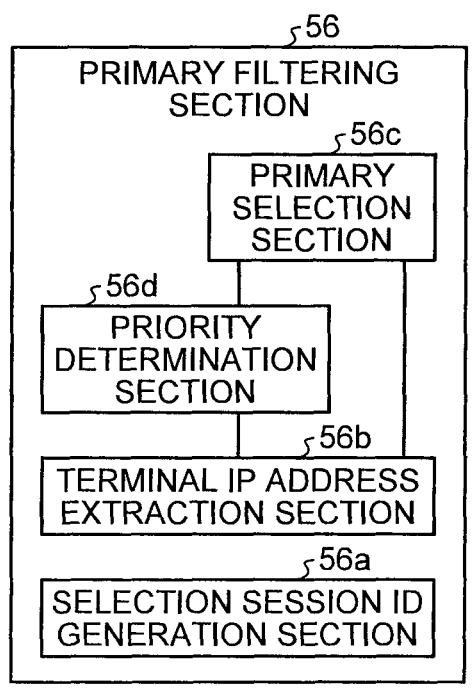
FIG. 9 is a schematic illustrating a functional structure of a primary filtering section.

FIG. 8 is a schematic illustrating a functional structure of the final filtering section. FIG. 9 is a schematic illustrating a functional structure of the primary filtering section. FIG. 11 is a conceptual view illustrating a relaying apparatus management table. FIG. 12 is a conceptual view illustrating a terminal authentication management table. FIG. 13 is a conceptual view illustrating a terminal management table. FIG. 14 is a conceptual view illustrating a destination list management table. FIG. 15 is a conceptual view illustrating a session management table. FIG. 16 is a conceptual view illustrating an address priority management table. FIG. 17 is a conceptual view illustrating a transmission speed priority management table. FIG. 18 is a conceptual view illustrating a quality management table.

(Relaying Apparatus Management Table)

In the storage section 5000, a relaying apparatus management DB 5001 having the relaying apparatus management table illustrated in FIG. 11 is structured. In the relaying apparatus management table, the operation state of the relaying apparatus 30, a receiving date at which the management system 50 received the state information indicating the operation state, the IP address of the relaying apparatus 30, and a maximum data transmission speed (Mbps) of the relaying apparatus 30 are managed in association with each other for each relaying apparatus ID of the relaying apparatuses 30. For example, the relaying apparatus management table illustrated in FIG. 11 indicates that, in relation to the relaying apparatus 30$a$ having the relaying apparatus ID of "111$a$", the operation state is "online", the date at which the management system 50 received the state information is "13:00 on Nov. 10, 2009", the IP address is "1.2.1.2", and the maximum data transmission speed is 100 Mbps.

(Terminal Authentication Management Table)

In addition, in the storage section 5000, a terminal authentication management DB 5002 having the terminal authentication management table illustrated in FIG. 12 is structured. In the terminal authentication management table, the passwords are managed in association with the respective terminal. IDs of all of the terminals 10 managed by the management system 50. For example, the terminal authentication management table illustrated in FIG. 12 indicates that the terminal ID of the terminal 10$aa$ is "01$aa$" and the password of the terminal 10$aa$ is "aaaa".

(Terminal Management Table)

Furthermore, in the storage section 5000, a terminal management DB 5003 having the terminal management table illustrated in FIG. 13 is structured. In the terminal management table, for each terminal ID of the terminals 10, the destination name of the terminal 10 when designated as the destination, the operation state of the terminal 10, a receiving date at which the management system 50 received login request information, which is described later, and the IP address of the terminal 10 are managed in association with each other. For example, the terminal management table illustrated in FIG. 13 indicates that, in relation to the terminal 10$aa$ having the terminal ID of "01$aa$", the terminal name is "AA terminal, Tokyo business office, Japan", the operation state is "online (a telephone conversation is enabled)", the date at which management system 50 received the login request information is "13:40 on Nov. 10, 2009", and the IP address is "1.2.1.3".

(Destination List Management Table)

Furthermore, in the storage section 5000, a destination list management DB 5004 having the destination list management table illustrated in FIG. 14 is structured. In the destination list management table, the terminal ID of the request origin terminal that requests a start of a telephone conversation in a television conference and all of the terminal IDs of the destination terminals registered as the candidates of the destination terminal are managed in association with each other. For example, the destination list management table illustrated in FIG. 14 indicates that the candidates of the destination terminal (terminal 10$db$) to which the request origin terminal (terminal 10$aa$) having the terminal ID of "01$aa$" can request a start of a telephone conversation in a television conference are the terminal 10$ab$ having the terminal ID of "01$ab$", the terminal 10$ba$ having the terminal ID of "01$ba$", and the terminal 10$bb$ having the terminal ID of "01$bb$". The candidate of the destination terminal is updated by being added or deleted in response to the request for adding or deleting the candidate made from any request origin terminal to the management system 50.

(Session Management Table)

Furthermore, in the storage section 5000, a session management DB 5005 having the session management table illustrated in FIG. 15 is structured. In the session management table, for each selection session ID used for executing a session for selecting the relaying apparatus 30, the relaying apparatus ID of the relaying apparatus 30 used for relaying image data and voice data, the terminal ID of the request origin terminal, the terminal ID of the destination terminal, delay time (ms) in receiving the image data by the destination terminal, and the receiving date at which the management system 50 received the delay information indicating the delay time from the destination terminal are managed in association with each other. For example, the session management table illustrated in FIG. 15 indicates that, in relation to the relaying apparatus 30$a$ (the relaying apparatus ID is "111$a$") selected in a session executed by using a selection session ID "se1", image data and voice data are relayed between the request origin terminal (terminal 10$aa$) having the terminal ID of "01$aa$" and the destination terminal (terminal 10$db$) having the terminal ID of "01$db$", and the delay time of the image data is 200 (ms) at the destination terminal (terminal 10$db$) as at "14:00 on Nov. 10, 2009". When a television conference is held between two terminals 10, the receiving date of the delay information may be managed in accordance with the delay information transmitted from the request origin terminal, instead of the destination terminal. However, when a television conference is held among three or more terminals 10, the receiving date of the delay information is managed in accordance with the delay information transmitted from the terminal 10 that receives image data and voice data.

(Address Priority Management Table)

In addition in the storage section 5000, a priority management DB 5006 having the address priority management table illustrated in FIG. 16 is structured. In the address priority management table, a discrepancy in dot addresses and an address priority are managed in association with each other. The dot address is composed of four section numbers as the commonly used IP address in IPv4. The more the "same" number is included in the dot addresses, the higher point the address priority has. The term "same" means that the numbers at the corresponding sections in both dot addresses are equal to each other while the term "difference" means that the numbers at the corresponding sections in both dot addresses are different from each other. For example, in the address priority management table illustrated in FIG. 16, when three values of the uppermost section and the succeeding two lower sections in each dot address are equal to each other between the IP addresses, the point of the address priority is "5". When two values of the uppermost section and the succeeding lower section in each dot address are equal to each other between the IP addresses, the point of the address priority is "3". In this case, the priority is independent of whether the value of the lowest section in each dot address is equal to each other. When the value of the uppermost section is equal to each other and the value of the second section, next to the uppermost section, in each dot address is different from each other between the IP addresses, the point of the address priority is "1". In this case, the priority is independent of whether the values of the third section and the lowest section in each dot address are equal to each other. When the value of the uppermost section in each dot address is different from each other between the IP addresses, the point of the address priority is "0". In this case, the priority is independent of whether the values of the second, the third and the lowest sections in each dot address are equal to each other.

(Transmission Speed Priority Management Table)

The priority management DB 5006 structured in the storage section 5000 also includes the transmission speed priority management table illustrated in FIG. 17. In the transmission speed priority management table, the maximum data transmission speed (Mbps) and a transmission speed priority are managed in association with each other such that as the value of the maximum data transmission speed at the relaying apparatus 30 increases, the higher point the transmission speed priority has. For example, in the transmission speed priority management table illustrated in FIG. 17, when the maximum data transmission speed at the relaying apparatus 30 is 1000 Mbps or more, the point of the transmission speed priority is "5". When the maximum data transmission speed at the relaying apparatus 30 is 100 Mbps or more and less than 1000 Mbps, the point of the transmission speed priority is "3". When the maximum data transmission speed at the relaying apparatus 30 is 10 Mbps or more and less than 100 Mbps, the point of the transmission speed priority is "1". When the maximum data transmission speed at the relaying apparatus 30 is less than 10 Mbps, the point of the transmission speed priority is "0".

(Quality Management Table)

In addition, in the storage section 5000, a quality management DB 5007 having the quality management table illustrated in FIG. 18 is structured. In the quality management table, the delay time (ms) of image data and image quality (quality of an image) of image data are managed in association with each other such that as the delay time of image data at the request origin terminal or the destination terminal increases, the image quality of image data relayed by the relaying apparatus 30 is lowered.

(Each Functional Structure of Management System)

Next, each functional structure of the management system 50 is described in detail. In the following description of each functional structure of the management system 50, a relationship between each functional structure of the management system 50 and major components that achieve each functional structure of the management system 50 among the components illustrated in FIG. 6 is also described.

The transmitting-receiving section 51 is executed by a command from the CPU 201 illustrated in FIG. 6 and the network I/F 209 illustrated in FIG. 6. The transmitting-receiving section 51 transmits and receives various types of data (information) between itself and the other terminals, apparatuses, or the system through the communications network 2.

The terminal authentication section 52, which is achieved by a command from the CPU 102 illustrated in FIG. 6, searches the terminal authentication management DB 5002 of the storage section 5000 by using the terminal ID and the password that are included in the login request information received through the transmitting-receiving section 51 as searching keys, and performs terminal authentication by determining whether the same terminal ID and password are managed in the terminal authentication management DB 5002.

The state management section 53, which is achieved by a command from the CPU 102 illustrated in FIG. 6, stores the terminal ID of the request origin terminal, the operation state of the request origin terminal, the receiving date at which the management system 50 received the login request information, and the IP address of the request origin terminal in the terminal management DB 5003 (refer to FIG. 13) and manages them in association with each other so as to manage the operation state of the request origin terminal that makes a login request. The state management section 53 changes the operation state in the terminal management DB 5003 (refer to FIG. 13) from online to offline in accordance with the state information that is sent from the terminal 10 and indicates that the power source is to be turned off when a user turns off the power source switch 109 of the terminal 10 from the on state.

The terminal extraction section 54, which is achieved by a command from the CPU 102 illustrated in FIG. 6, searches the destination list management DB 5004 (refer to FIG. 14) by using the terminal ID of the request origin terminal that has made a login request as a key, reads the terminal IDs of the candidates of the destination terminal capable of having a telephone conversation with the request origin terminal, and extracts the terminal IDs. In addition, the terminal extraction section 54 searches the destination list management DB 5004 (refer to FIG. 14) by using the terminal ID of the request origin terminal that has made the login request as a key, and extracts the terminal IDs of the other request origin terminals that register the terminal ID of the request origin terminal as the candidate of the destination terminal.

The terminal state acquisition section 55, which is achieved by a command from the CPU 102 illustrated in FIG. 6, searches the terminal management DB 5003 (refer to FIG. 13) by using the terminal IDs of the candidates of the destination terminal extracted by the terminal extraction section 54 as searching keys, and reads the operation state of each terminal ID extracted by the terminal extraction section 54. As a result, the terminal state acquisition section 55 can acquire the operation states of the candidates of the destination terminal capable of having a telephone conversation with the request origin terminal that has made the login request. Furthermore, the terminal state acquisition section 55 searches the terminal management DB 5003 by using the terminal IDs extracted by the terminal extraction section 54 as searching keys, and acquires the operation state of the request origin terminal that has made the login request.

The primary filtering section 56, which is achieved by a command from the CPU 102 illustrated in FIG. 6, performs primary filtering processing prior to the final filtering processing so as to assist the final filtering processing in which one of the relaying apparatuses 30 is finally selected. The primary filtering section 56 is achieved by a command from the CPU 201 illustrated in FIG. 5 so as to include a selection session ID generation section 56a, a terminal IP address extraction section 56b, a primary selection section 56c, and a priority determination section 56d.

The selection session ID generation section 56a generates the selection session ID used for executing a session for selecting the relaying apparatus 30. The terminal IP address extraction section 56b searches the terminal management DB 5003 (refer to FIG. 13) in accordance with the terminal ID of the request origin terminal and the terminal ID of the destination terminal that are included in start request information transmitted from the request origin terminal, and extracts the IP addresses of the respective terminals 10 corresponding to the terminal IDs. The primary selection section 56c selects the relaying apparatus 30 by selecting the relaying apparatus IDs of the relaying apparatuses 30 the operation state of which is "online" among the relaying apparatuses 30 managed by the relaying apparatus management DB 5001 (refer to FIG. 11).

In addition, the primary selection section 56c searches the relaying apparatus management DB 5001 (refer to FIG. 11) in accordance with the IP address of the request origin terminal and the IP address of the destination terminal that are extracted by the terminal IP address extraction section 56b, and investigates whether the dot address of each IP address of the request origin terminal and the destination terminal is the same as or different from the dot addresses of the IP addresses of the selected relaying apparatuses 30. The primary selection section 56c also selects two relaying apparatuses 30 having the top two high total points. The total point is obtained as a sum of the higher point in the address priority with respect to the terminals 10 and the point of the transmission speed priority for each relaying apparatus. Although the two relaying apparatuses 30 having the top two high points are selected in the embodiment, the number of relaying apparatuses 30 to be selected is not limited to two. Three or more relaying apparatuses 30 having the top three or more high points may be selected as long as the relaying apparatuses 30 having high points can be selected as many as possible.

The priority determination section 56d determines the point of the address priority for each relaying apparatus 30 investigated by the primary selection section 56c with reference to the priority management DB 5006 (refer to FIG. 16). In addition, the priority determination section 56d searches the priority management DB 5006 (refer to FIG. 17) in accordance with the maximum data transmission speed of each relaying apparatus 30 managed by the relaying apparatus management DB 5001 (refer to FIG. 11), and determines the point of the transmission speed priority of each relaying apparatus 30 selected by the primary filtering processing performed by the primary selection section 56c.

The session management section 57, which is achieved by a command from the CPU 102 illustrated in FIG. 6, stores the selection session ID generated by the selection session ID generation section 56a, the terminal ID of the request origin terminal, and the terminal ID of the destination terminal in the session management DB 5005 of the storage section 5000 (refer to FIG. 15), and manages them in association with each other. In addition, the session management section 57 stores the relaying apparatus ID of the relaying apparatus 30 finally selected by a final selection section 61b of the terminal 10 for each selection session ID in the session management DB 5005 (refer to FIG. 15), and manages them.

The quality determination section 58 searches the quality management DB 5007 (refer to FIG. 18) by using the delay time as a searching key, extracts the image quality of the image data corresponding to the delay time, and determines the image quality of the image data to be relayed by the relaying apparatus 30.

The storage-read processing section 59, which is executed by a command from the CPU 102 illustrated in FIG. 6 and the HDD 205 illustrated in FIG. 6, stores various types of data in the storage section 5000 or read various types of data stored in the storage section 5000.

The delay time management section 60, which is achieved by a command from the CPU 102 illustrated in FIG. 6, searches the terminal management DB 5003 (refer to FIG. 13) by using the IP address of the destination terminal as a searching key, and extracts the terminal ID corresponding to the IP address. In addition, the delay time management section 60 stores the delay time indicated in the delay information in a field of the delay time of a record including the extracted terminal ID in the session management table of the session management DB 5005 (refer to FIG. 15) and manages the stored delay time.

The final filtering section 61, which finally selects one of the relaying apparatuses 30, is achieved by a command from the CPU 201 illustrated in FIG. 6 so as to include a calculation section 61a and the final selection section 61b as illustrated in FIG. 8.

The calculation section 61a calculates a first necessary period of time (t1) from transmitting to receiving the first prior transmission information, for each arbitrary IP address of the relaying apparatuses 30 in an arbitrary session ID, on the basis of a time difference between first receiving date (tr1) indicated by first receiving date information and first transmission date (tt1) indicated by first transmission date information. Similarly, the calculation section 61a calculates a second necessary period of time (t2) from transmitting to receiving the second prior transmission information, for each IP address of the relaying apparatuses 30 in the same session ID as that of the above-described calculation, on the basis of a time difference between second receiving date (tr2) indicated by second receiving date information and second transmission date (tt2) indicated by second transmission date information.

The calculation section 61a calculates a total necessary period of time (T) by summing the calculated first necessary period of time (t1) and the second necessary period of time (t2) for each arbitrary IP address of the relaying apparatuses 30 in an arbitrary session ID.

The final selection section 61b determines whether the number of total necessary periods of time (T) calculated by the calculation section 61a is equal to the number of relaying apparatuses 30 that are to be used for relaying in the session executed by using the session ID. If all of the total necessary periods of time (T) are not yet calculated, the final selection section 61b determines whether a predetermined period of time (in this case, one minute) elapses from the starting of the calculation of the total necessary period of time (T). On the other hand, if the final selection section 61b completes the calculation of all of the total necessary periods of time (T), or the predetermined period of time (in this case, one minute) elapses, the final selection section 61b selects the relaying apparatus 30 related to the shortest total necessary period of time (T) in the total necessary periods of time (T) having been calculated by the calculation section 61a. That is, the final selection section 61b selects the relaying apparatus 30 that has received the first prior transmission information and the second prior transmission information by which the shortest total necessary period of time (T) has been calculated in the total necessary periods of time (T) having been calculated by the calculation section 61a.

<<Processing or Operation of the Embodiment>>

Figure 19:
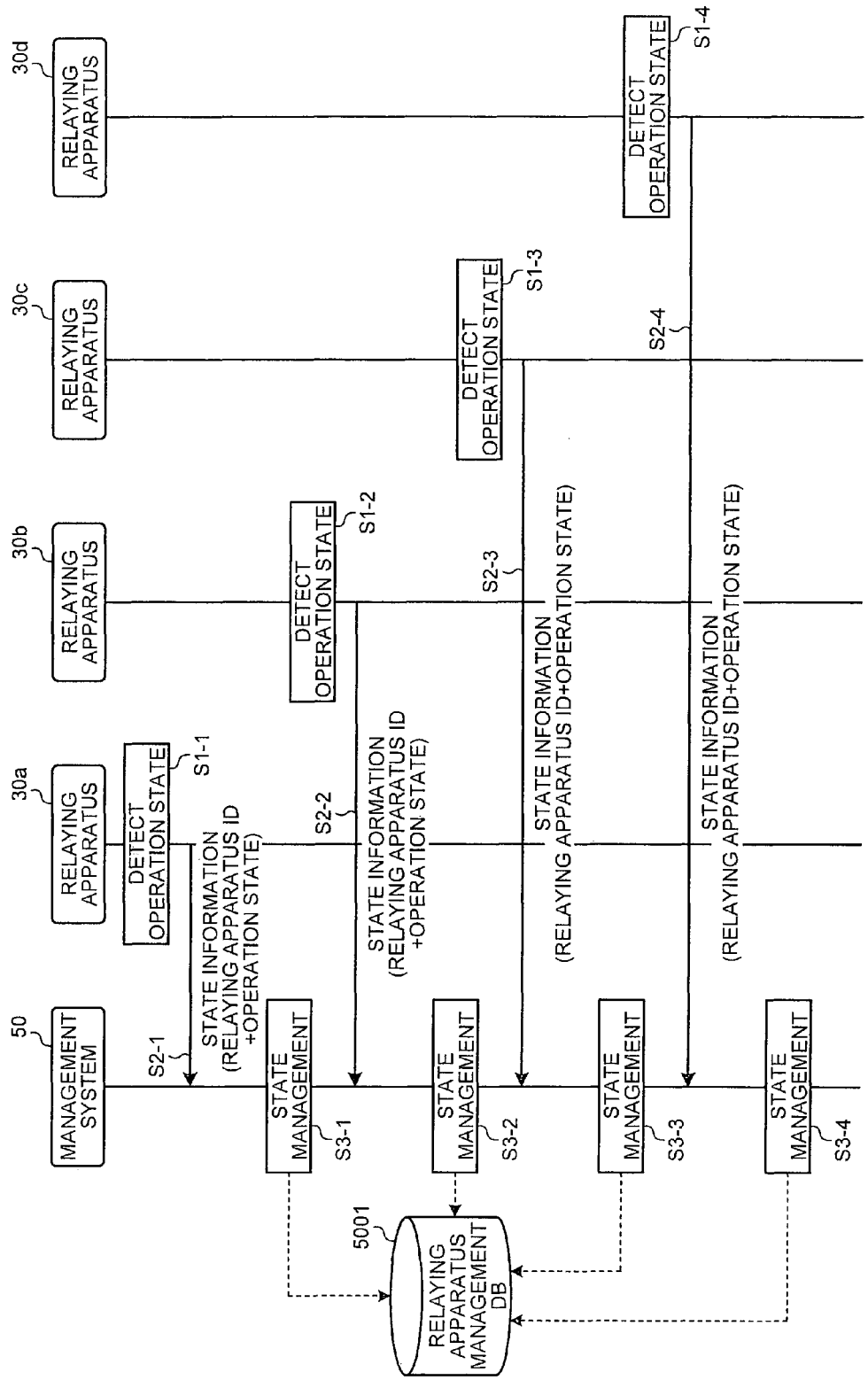
FIG. 19 is a sequence diagram illustrating processing to manage state information indicating an operation state of each relaying apparatus.
Figure 20:
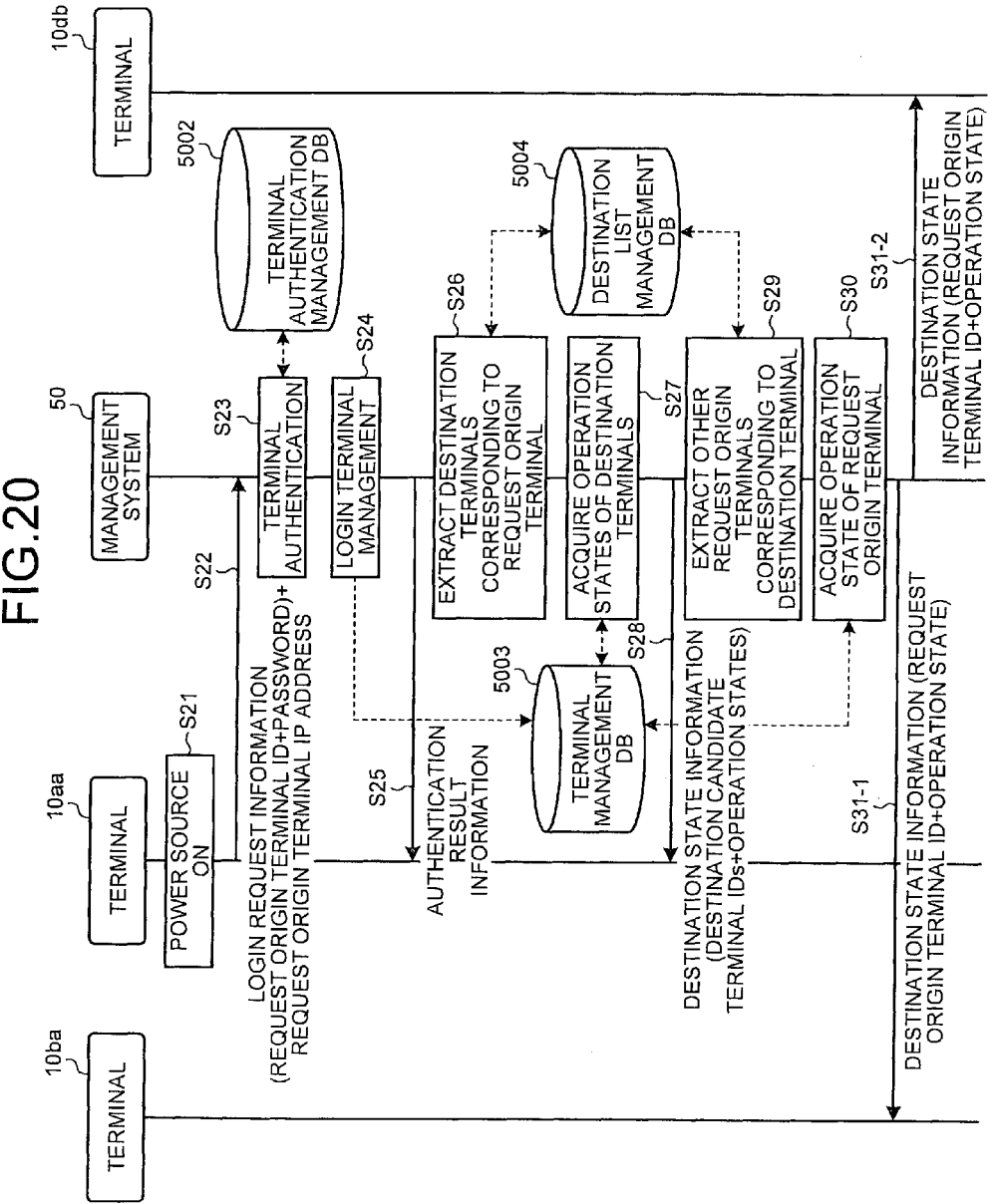
FIG. 20 is a sequence diagram illustrating processing at a preparatory stage in which a preparation is made for starting remote communications between terminals.
Figure 21:
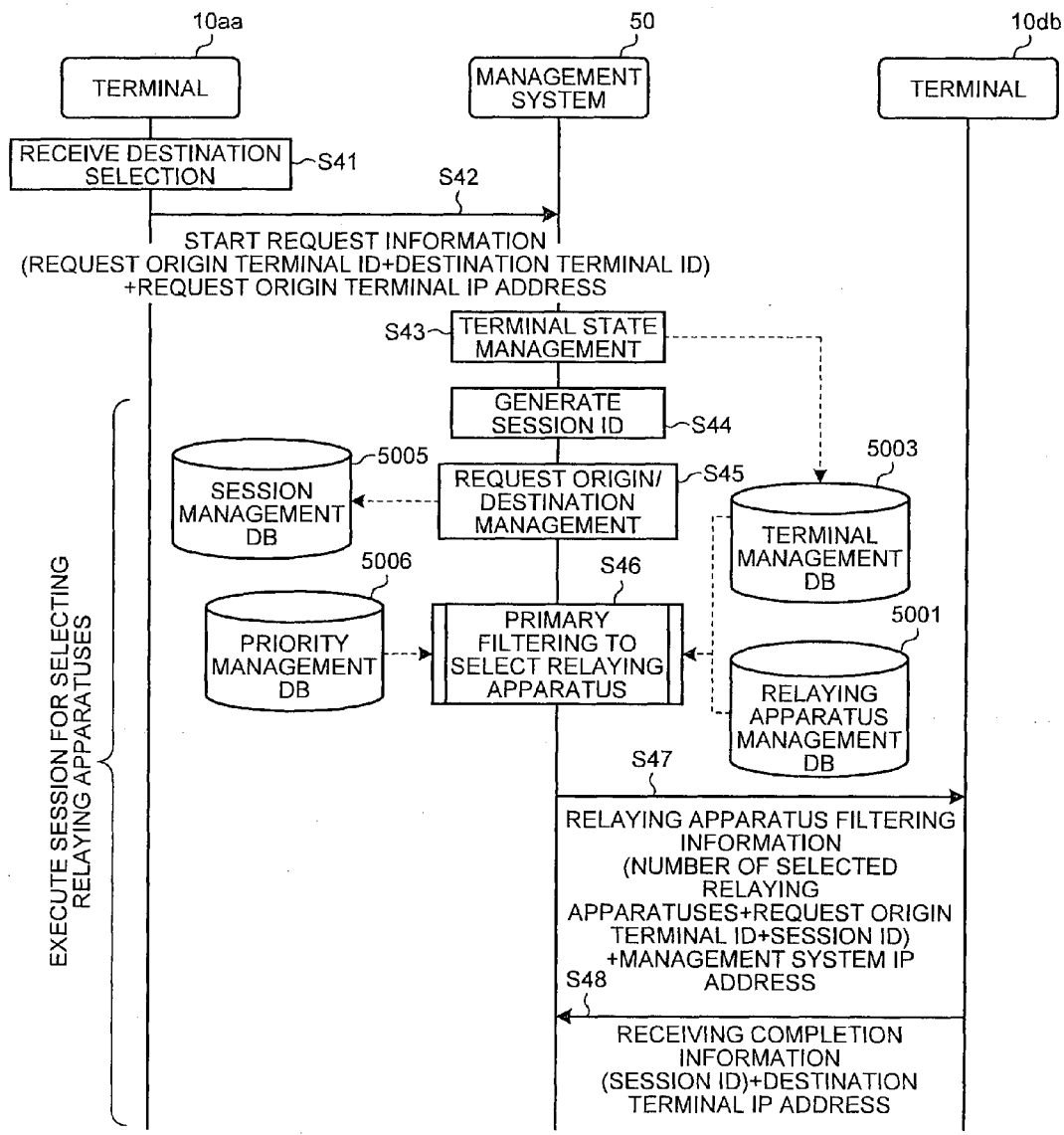
FIG. 21 is a sequence diagram illustrating filtering processing to select the relaying apparatuses.
Figure 22:
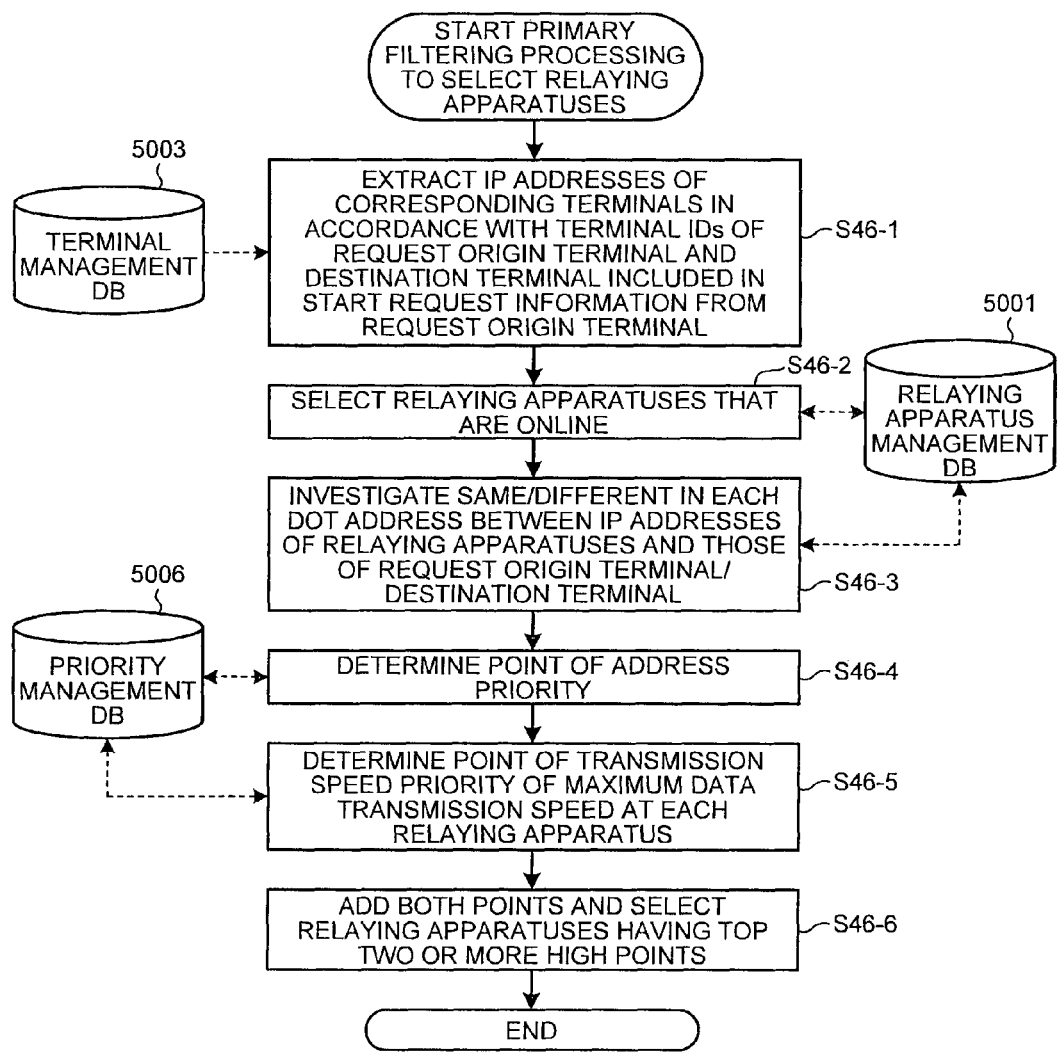
FIG. 22 is a process flowchart illustrating filtering processing to select the relaying apparatuses.
Figure 24:
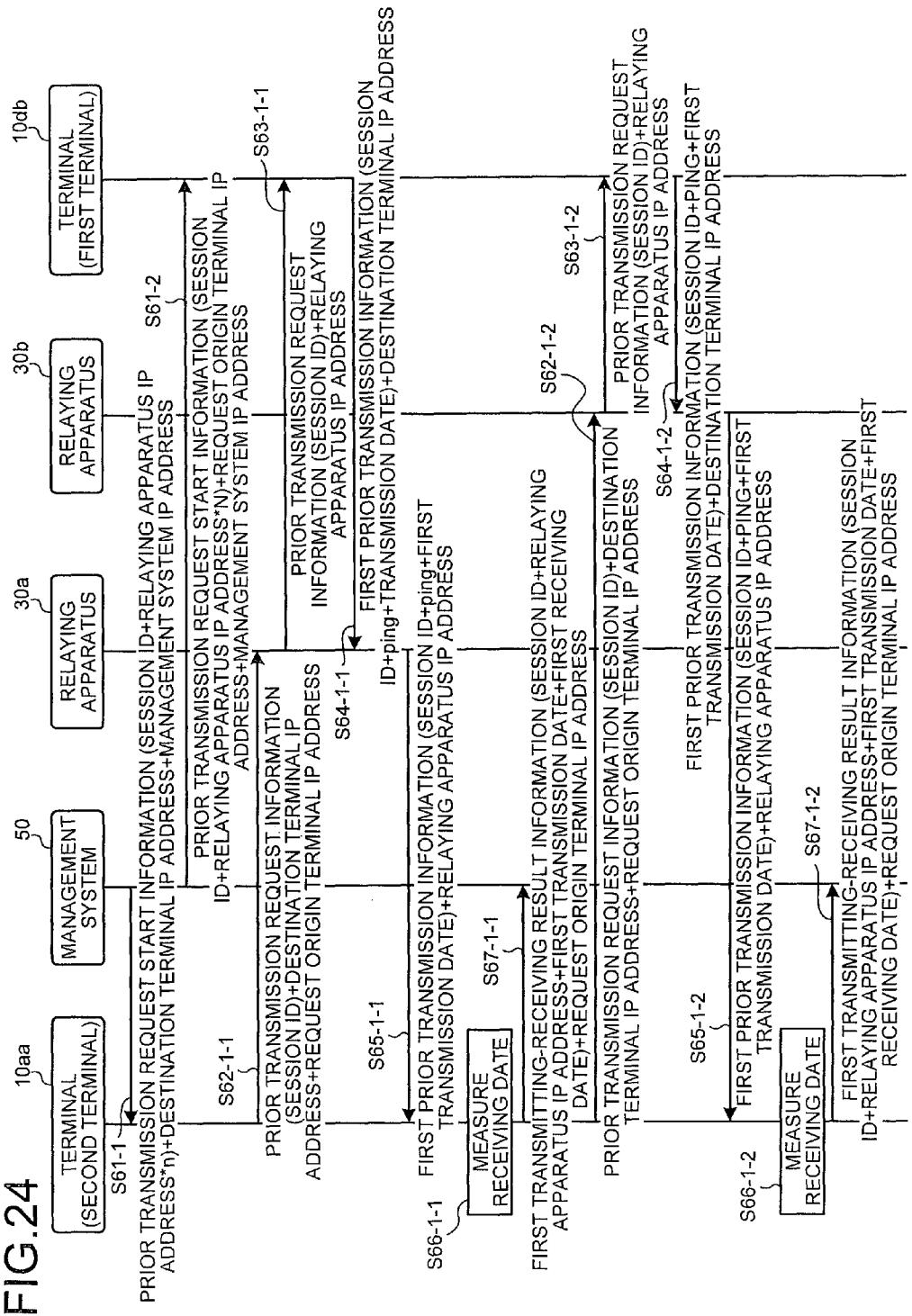
FIG. 24 is a sequence diagram illustrating processing in which the transmission management system selects the relaying apparatus according to the first embodiment.
Figure 25:
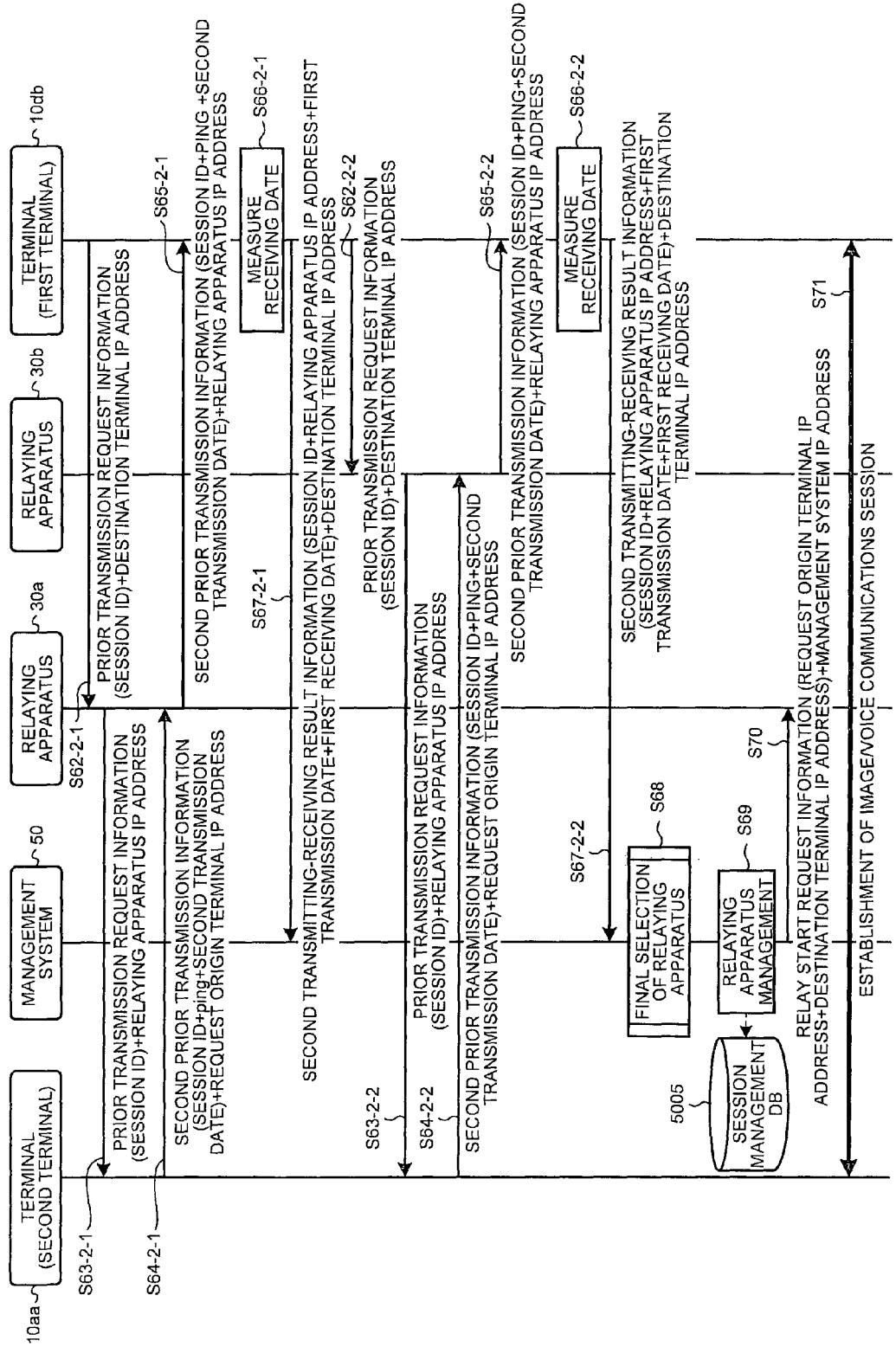
FIG. 25 is a sequence diagram illustrating processing in which the transmission management system selects the relaying apparatus according to the first embodiment.
Figure 26:
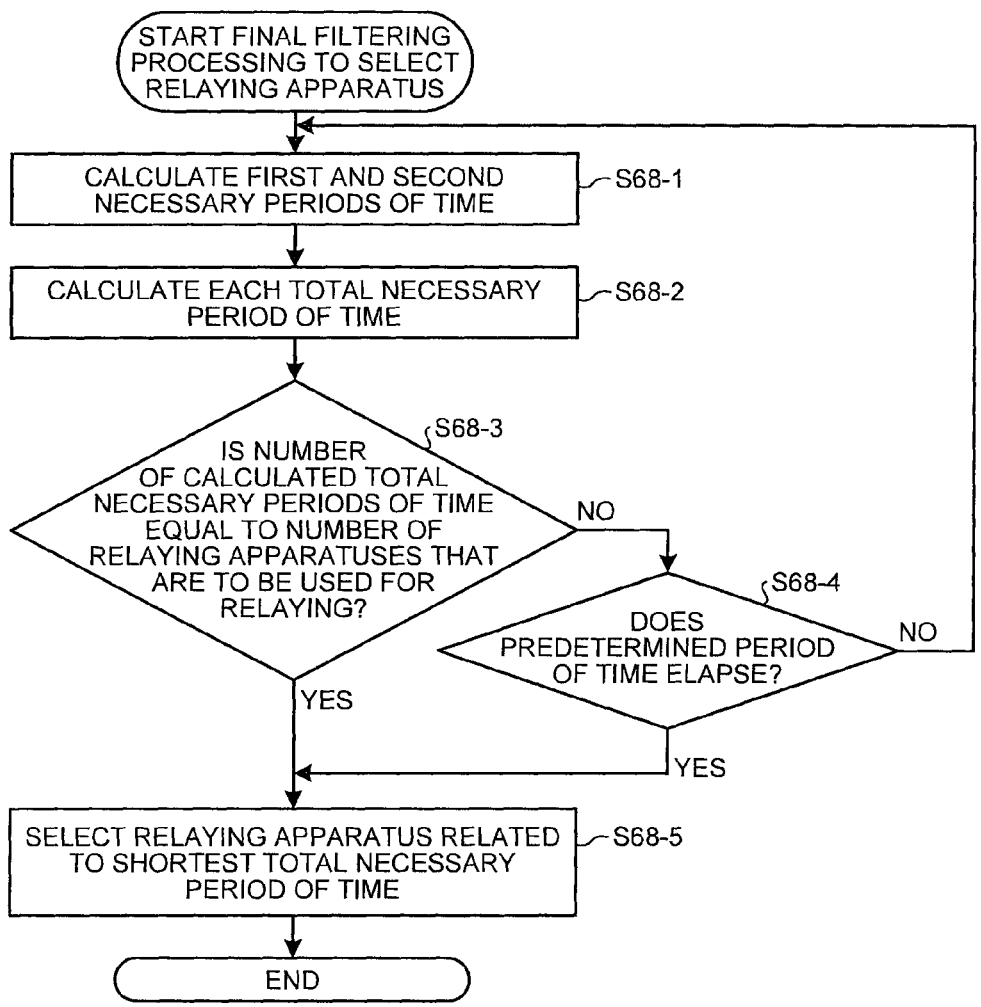
FIG. 26 is a flowchart illustrating processing in which the terminal selects the relaying apparatus.
Figure 27:
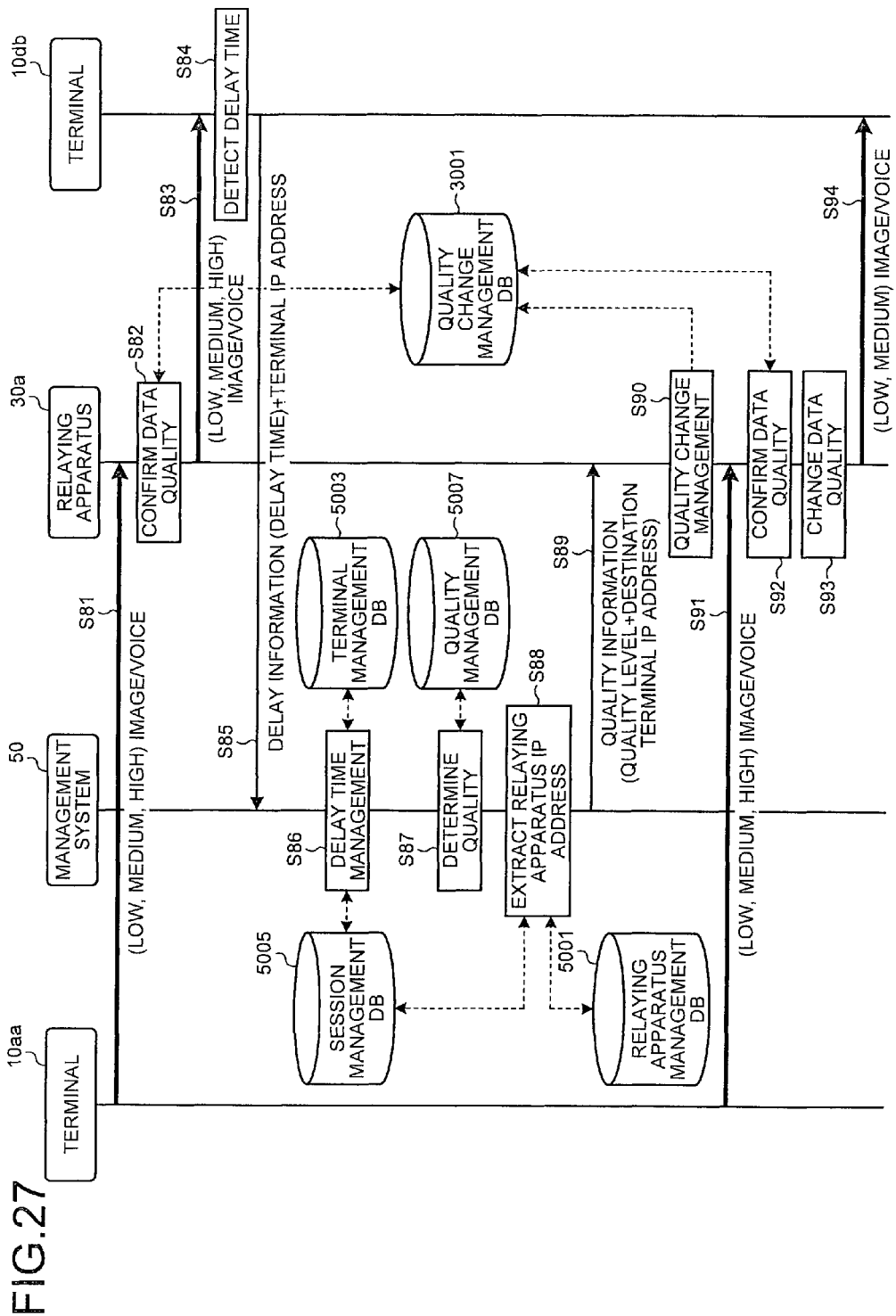
FIG. 27 is a sequence diagram illustrating processing in which image data and voice data are transmitted and received between the terminals.

A processing method of the transmission system 1 according to the embodiment is described below with reference to FIGS. 19 to 27. FIG. 19 is a sequence diagram illustrating processing to manage state information that indicates a state of each relaying apparatus 30 and is transmitted to the management system 50 from each relaying apparatus 30. FIG. 20 is a sequence diagram illustrating processing at a preparatory stage in which a preparation is made for starting making a telephone conversation among the terminals 10. FIG. 21 is a sequence diagram illustrating filtering processing to select the relaying apparatuses 30. FIG. 22 is a process flowchart illustrating filtering processing to select the relaying apparatuses 30. FIG. 23 is a schematic illustrating calculation of the points of priorities when the filtering processing to select the relaying apparatuses 30 is performed. FIGS. 24 and 25 are sequence diagrams illustrating processing in which the transmission management system 50 selects the relaying apparatus 30. FIG. 26 is a flowchart illustrating processing in which the terminal selects the relaying apparatus 30. FIG. 27 is a sequence diagram illustrating processing in which image data and voice data are transmitted and received between the terminals.

First, the processing to manage the state information that indicates a state of each relaying apparatus 30 and is transmitted to the management system 50 from each relaying apparatus 30 is described with reference to FIG. 19. In each relaying apparatus 30, the state detection section 32 illustrated in FIG. 7 periodically detects the operation state of the relaying apparatus 30 itself (steps S1-1 to S1-4). The transmitting-receiving section 31 of each relaying apparatus 30 periodically, transmits the state information to the management system 50 through the communications network 2 such that the management system 50 manages the operation state of each relaying apparatus 30 in real time (steps S2-1 to S2-4). Each state information includes the relaying apparatus ID and the operation state, which is detected by the state detection section 32, of the relaying apparatus 30 identified with the relaying apparatus ID. In the embodiment, the relaying apparatuses (30a, 30b, and 30d) are in "online" while being normally operated. On the other hand, the relaying apparatus 30c is "offline" though being operated because some sort of failures have occurred in a program for executing relaying operation of the relaying apparatus 30c.

In the management system 50, the transmitting-receiving section 51 receives the state information transmitted from each relaying apparatus 30. The management system 50 stores the state information for each relaying apparatus ID in the relaying apparatus management DB 5001 (refer to FIG. 11) of the storage section 5000 through the storage-read processing section 59 and manages them (steps S3-1 to S3-4). As a result, the operation state is stored for each relaying apparatus ID as any one of "online", "offline", and "in failure" in the relaying apparatus management table as illustrated in FIG. 11 and managed. Meanwhile, the receiving date at which the management system 50 received the state information is stored for each relaying apparatus ID and managed. When no state information is transmitted from the relaying apparatus 30, fields of the operation state and the receiving date in each record of the relaying apparatus management table illustrated in FIG. 11 are blank or the operation state and the receiving date of the latest receiving are indicated in the respective fields.

Transmitting-receiving processing of various types of management information at the preparatory state before a telephone conversation starts between the terminals 10aa and 10db is described below with reference to FIG. 20. In FIG. 20, various types of management information are transmitted and received by the management information session "sei".

Once a user turns on the power source switch 109 illustrated in FIG. 5, the operation input receiving section 12 illustrated in FIG. 7 receives the power source on and causes the power source to be turned on (step S21). The login request section 13, once the power source on is received, automatically transmits the login request information indicating a request for a login to the management system 50 from the transmitting-receiving section 11 through the communications network 2 (step S22). The login request information includes the terminal ID and the password to identify the terminal 10aa itself as a login request origin. The terminal ID and the password are read from the storage section 1000 through the storage-read processing section 19 and transmitted to the transmitting-receiving section 11 as data. When the login request information is transmitted to the management system 50 from the terminal 10aa, the management system 50 serving as the receiving side can grasp the IP address of the terminal 10ab serving as the transmission side.

Then, the terminal authentication section 52 of the management system 50 searches the terminal authentication management DB 5002 of the storage section 5000 (refer to FIG. 12) by using the terminal ID and the password that are included in the login request information received through the transmitting-receiving section 51 as searching keys, and performs terminal authentication by determining whether the same terminal ID and password are managed in the terminal authentication management DB 5002 (step S23). If the terminal authentication section 52 determines that the login request is transmitted from the terminal 10 having use authority because the same terminal ID and password are managed, the state management section 53 stores the terminal ID, the operation state, the receiving date of the login request information, and the IP address of the terminal 10aa in the terminal management DB 5003 (refer to FIG. 13) in association with each other (step S24). As a result, the terminal management table illustrated in FIG. 13 manages the terminal ID "01aa", the operation state "online", the receiving date "13:40 on Nov. 10, 2009", and the IP address "1.2.1.3" of the terminal 10aa in association with each other.

Then, the transmitting-receiving section 51 of the management system 50 transmits authentication result information indicating the authentication result obtained by the terminal authentication section 52 to the request origin terminal (terminal 10aa) that has made the login request through the communications network 2 (step S25). In the embodiment, the following description is made on the case in which the request origin terminal is determined as the terminal having use authority by the terminal authentication section 52.

The terminal extraction section 54 of the management system 50 searches the destination list management DB 5004 (refer to FIG. 14) by using the terminal ID "01aa" of the request origin terminal (terminal 10aa) that has made the login request as a searching key, and reads and extracts the terminal IDs of the candidates of the destination terminal capable of performing communications with the request origin terminal (terminal 10aa) (step S26). In this case, the terminal IDs ("01ab", "01ba", and "01db") of the destination terminals (terminals 10ab, 10ba, and 10db) corresponding to the terminal ID "01aa" of the request origin terminal (terminal 10aa) are extracted.

Then, the terminal state acquisition section 55 searches the terminal management DB 5003 (refer to FIG. 13) by using the terminal IDs ("01ab", "01ba", and "01db") of the candidates of the destination terminal extracted by the terminal extraction section 54 as searching keys, and reads the operation states ("offline", "online", and "online") corresponding to the respective terminal IDs extracted by the terminal extraction section 54. As a result, the terminal state acquisition section 55 acquires the respective operation states of the terminals (10ab, 10ba, and 10db) (step S27).

Then, the transmitting-receiving section 51 transmits, to the request origin terminal (terminal 10aa) through the communications network 2, destination state information including the terminal IDs ("01ab", "01ba", and "01db") used as the searching keys at step S27 and the operation states ("offline", "online", and "online") of the destination terminals (terminals 10ab, 10ba, and 10db) corresponding to the respective terminal IDs (step S28). As a result, the request origin terminal (terminal 10aa) can grasp the respective current operation states ("offline", "online", and "online") of the terminals (10ab, 10ba, and 10db) that are the candidates of the destination terminal capable of performing communications with the request origin terminal (terminal 10aa).

Furthermore, the terminal extraction section 54 of the management system 50 searches the destination list management DB 5004 (refer to FIG. 14) by using the terminal ID "01aa" of the request origin terminal (terminal 10aa) that has made the login request as a searching key, and extracts the terminal IDs of the other request origin terminals that register the terminal ID "01aa" of the request origin terminal (terminal 10aa) as the candidate of the destination terminal (step S29). In the destination list management table illustrated in FIG. 14, the terminal IDs "01ab", "01ba", and "01db" of the other request origin terminals are extracted.

Then, the terminal state acquisition section 55 of the management system 50 searches the terminal management DB 5003 (refer to FIG. 13) by using the terminal ID "01aa" of the request origin terminal (terminal 10aa) that has made the login request as a searching key, and acquires the operation state of the request origin terminal (terminal 10aa) that has made the login request (step S30).

Then, the transmitting-receiving section 51 transmits the destination state information including the terminal ID "01aa" of the request origin terminal (terminal 10aa) and the operation state "online" that are acquired at step S30 to the terminals (10ba and 10db) each operation state of which is "online" in the terminal management DB 5003 (refer to FIG. 13) among the terminals (10ab, 10ba, and 10db) that are identified with the terminal IDs ("01ab", "01ba", and "01db") extracted at step S29 (steps S31-1 and S31-2). When transmitting the destination state information to the terminals (10ba and 10db), the transmitting-receiving section 51 refers to the IP addresses of the terminals managed by the terminal management table illustrated in FIG. 13 in accordance with the terminal IDs ("01ba" and "01db"). As a result, the terminal ID "01aa" and the operation state "online" of the request origin terminal (terminal 10aa) that has made the login request can be transmitted to each of the other destination terminals (terminals 10db and 10ba) capable of performing communications with the request origin terminal (terminal 10aa) that has made the login request as the destination.

In each of the other terminals 10, once a user turns on the power source switch 109 illustrated in FIG. 6, the operation input receiving section 12 illustrated in FIG. 7 receives the power source on in the same manner as step S21, and performs the processing in the same manner as steps S22 to S31-1 and S31-2. The description thereof is thus omitted.

The processing to select the relaying apparatuses 30 is described below with reference to FIG. 21. In FIG. 21, various types of management information are totally transmitted and received by the management information session "sei". In the embodiment, the request origin terminal (terminal 10aa) can have a telephone conversation with at least one of the terminals (10ba and 10db) the operation states of which are online, which are indicated in the state information received at step S32, among the terminals 10 serving as the candidates of the destination. The following description is made on the case in which a user who uses the request origin terminal (terminal 10aa) selects a start of a telephone conversation with the destination terminal (terminal 10db).

Once the user presses the operation button 108 illustrated in FIG. 5 so as to select the terminal 10db, the operation input receiving section 12 illustrated in FIG. 7 receives a request for starting a telephone conversation with the destination terminal (terminal 10db) (step S41). Then, the transmitting-receiving section 11 of the request origin terminal (terminal 10aa) transmits the start request information that includes the terminal ID "01aa" of the terminal 10aa and the terminal ID "01db" of the destination terminal (terminal 10db) and indicates that a telephone conversation is to be started to the management system 50 (step S42). As a result, the transmitting-receiving section 51 of the management system 50 receives the start request information and can grasp the IP address "1.2.1.3" of the request origin terminal (terminal 10aa) serving as the transmission origin.

The state management section 53 changes both fields of the operation state in the records respectively including the terminal IDs "01aa" and "01db" of the terminal management table of the terminal management DB 5003 (refer to FIG. 13) to "busy" in accordance with the terminal ID "01aa" of the request origin terminal (terminal 10aa) and the terminal ID "01db" of the destination terminal (terminal 10db) that are included in the start request information (step S43). In this case, the request origin terminal (terminal 10aa) and the destination terminal (terminal 10db) are busy and do not start a telephone conversation. If the other terminals 10 tend to have a telephone conversation with the request origin terminal (terminal 10aa) or the destination terminal (terminal 10db), a voice or display that indicates a so-called busy state is output.

The processing to execute the session for selecting the relaying apparatuses 30 is described below with reference to steps S44 to S48 and steps S61-1 to S66. The selection session ID generation section 56a generates the selection session ID used for executing a session for selecting the relaying apparatuses 30 (step S44). The session management section 57 stores a selection session ID "se1" generated at step S44, the terminal ID "01aa" of the request origin terminal (terminal 10aa), and the terminal ID "01db" of the destination terminal (terminal 10db) in the session management DB 5005 (refer to FIG. 15) of the storage section 5000 and manages them in association with each other (step S45).

Then, the primary filtering section 56 of the management system 50 performs the primary filtering for the relaying apparatus 30 that relays a telephone conversation between the request origin terminal (terminal 10aa) and the destination terminal (terminal 10db) in accordance with the relaying apparatus management DB 5001, the terminal management DB 5003, and the priority management DB 5006 (step S46).

The processing performed at step S46 is described in further detail below with reference to FIG. 22. First, the terminal IP address extraction section 56b searches the terminal management DB 5003 (refer to FIG. 13) in accordance with the terminal ID "01aa" of the request origin terminal (terminal 10aa) and the terminal ID "01db" of the destination terminal (terminal 10db) that are included in start communications request information transmitted from the request origin terminal (terminal 10aa), and extracts the IP addresses ("1.2.1.3" and "1.3.2.4") of the terminals (10aa and 10db) respectively corresponding to the terminal IDs "01aa" and "01db" (step S46-1).

Then, the primary selection section 56c selects the respective relaying apparatus IDs (111a, 111b, and 111d) of the relaying apparatuses (30a, 30b, and 30d) the operation states of which are "online" among the relaying apparatuses 30 managed by the relaying apparatus management DB 5001 (refer to FIG. 11) (step S46-2). In addition, the primary selection section 56c searches the relaying apparatus management DB 5001 (refer to FIG. 11) in accordance with the IP address "1.2.1.3" of the request origin terminal (terminal 10aa) and the IP address "1.3.2.4" of the destination terminal (terminal 10*db*) that are extracted at step S46-1, and investigates whether each dot address of the IP addresses ("1.2.1.2", "1.2.2.2", and "1.3.2.2") of the relaying apparatuses (30*a*, 30*b*, and 30*d*) selected at step S46-2 is the same as or different from each dot address of the IP addresses ("1.2.1.3" and "1.3.2.4") of the request origin terminal (terminal 10*aa*) and the destination terminal (terminal 10*db*) (step S46-3).

Then, the priority determination section 56*d* determines the point of the address priority for each of the relaying apparatuses (30*a*, 30*b*, and 30*d*) investigated at step S46-3 with reference to the priority management DB 5006 (refer to FIG. 16) (step S46-4). The results of the determination processing are illustrated in the table of FIG. 23. FIG. 23 is a schematic illustrating the calculation of the points of priorities when the filtering processing to select the relaying apparatuses 30 is performed. FIG. 23 illustrates the point of the address priority, the point of the transmission speed priority, and the total point for each relaying apparatus ID. The point of the address priority is further classified into the point of each relaying apparatus 30 with respect to the request origin terminal (terminal 10*aa*) and the point with respect to the destination terminal (terminal 10*db*). The total point is the sum of the higher point in the two points of the address priority and the point of transmission speed priority.

In the embodiment, the IP address "1.2.1.2" of the relaying apparatus 30*a* is expressed as "same.same.same.different" with respect to the IP address "1.2.1.3" of the request origin terminal (terminal 10*aa*). As a result, the point of the address priority is "5" as illustrated in FIG. 23. As illustrated in FIG. 1, the IP address of the relaying apparatus 30*a* is "1.2.1.2" while the IP address of the destination terminal (terminal 10*db*) is "1.3.2.4". Accordingly, the IP address of the relaying apparatus 30*a* is expressed as "same.different.different.different" as illustrated in FIG. 16 with respect to the IP address "1.3.2.4" of the destination terminal (terminal 10*db*). As a result, the point of the address priority is "1" as illustrated in FIG. 23. The IP address "1.2.2.2" of the relaying apparatus 30*b* is expressed as "same.same.different.different" with respect to the IP address "1.2.1.3" of the request origin terminal (terminal 10*aa*). As a result, the point of the address priority is "3". The IP address "1.2.2.2" of the relaying apparatus 30*b* is expressed as "same.different.same.different" with respect to the IP address "1.3.2.4" of the destination terminal (terminal 10*db*). As a result, the point of the address priority is "1". The IP address "1.3.2.2" of the relaying apparatus 30*d* is expressed as "same.different.different.different" with respect to the IP address "1.2.1.3" of the request origin terminal (terminal 10*aa*). As a result, the point of the address priority is "1". The IP address "1.3.2.2" of the relaying apparatus 30*d* is expressed as "same.same.same.different" with respect to the IP address "1.3.2.4" of the destination terminal (terminal 10*db*). As a result, the point of the address priority is "5".

Referring back to FIG. 22, the priority determination section 56*d* searches the priority management DB 5006 (refer to FIG. 17) in accordance with the maximum data transmission speed of each relaying apparatus 30 managed by the relaying apparatus management DB 5001 (refer to FIG. 11), and determines the point of the transmission speed priority for each of the relaying apparatuses (30*a*, 30*b*, and 30*d*) selected by the primary filtering processing performed at step S46-2 (step S46-5). In the embodiment, the maximum data transmission speed of the relaying apparatus 30*a* is 100 (Mbps) as illustrated in FIG. 11. Accordingly, the point of the transmission speed priority is determined as 3 with reference to the transmission speed priority illustrated in FIG. 17. Likewise, the maximum data transmission speed of the relaying apparatus 30*b* is calculated as 1000 (Mbps). Accordingly, the point of the transmission speed priority is determined as 5. Likewise, the maximum data transmission speed of the relaying apparatus 30*d* is calculated as 10 (Mbps). Accordingly, the point of transmission speed priority is determined as 1.

Then, the primary selection section 56*c* selects two relaying apparatuses 30 having the top two total high points among the relaying apparatuses (30*a*, 30*b*, and 30*d*) each of which has the total point that is the sum of the point of the transmission speed priority and the higher point in the address priority, which is the point with respect to either one of the terminals (10*aa* and 10*db*) (step S46-6). In the embodiment, the total points of the respective relaying apparatus IDs (111*a*, 111*b*, and 111*d*) are "8", "8", and "6" as illustrated in FIG. 23. Accordingly, the relaying apparatus 30*a* having the relaying ID "111*a*" and the relaying apparatus 30*b* having the relaying apparatus ID "111*b*" are selected.

After the filtering processing at step S46 is complete, the transmitting-receiving section 51 illustrated in FIG. 7 transmits relaying apparatus filtering information for transferring the number of relaying apparatuses 30 selected as described above to the destination terminal (terminal 10*db*) through the communications network 2 (step S47). The relaying apparatus filtering information includes the number of relaying apparatuses 30 selected at step S46, which is "2", the terminal ID "01*aa*" of the request origin terminal (terminal 10*aa*), and the selection session ID "se1". As a result, the terminal 10*db* can grasp the number of relaying apparatuses 30 and from which terminal 10 a request for starting a telephone conversation is made in the execution of the session performed by using the selection session ID "se1", and the IP address "1.1.1.2" of the management system 50 serving as the transmission origin of the relaying apparatus filtering information.

Then, the terminal 10*db* transmits receiving completion information indicating the completion of the receiving of the relaying apparatus filtering information to the management system 50 from the transmitting-receiving section 11 through the communications network 2 (step S48). The receiving completion information includes the session ID "se1". As a result, the management system 50 can grasp that the transfer of the number of relaying apparatuses in the session executed by using the session ID "se1" is complete and the IP address "1.3.2.4" of the destination terminal (terminal 10*db*) serving as the transmission origin.

Processing in which the management system 50 selects the relaying apparatus 30 is described below with reference to FIGS. 24 to 26.

First, the management system 50 causes the request origin terminal (terminal 10*aa*) and the destination terminal (terminal 10*db*) to start transmitting prior transmission request information, which is described later, prior to starting a telephone conversation in a television conference. The management system 50 transmits prior transmission request start information and the IP address "1.3.2.4" of the destination terminal (terminal 10*db*) to the request origin terminal (terminal 10*aa*) from the transmitting-receiving section 51 through the communications network 2 (step S61-1). Likewise, the management system 50 transmits the prior transmission request start information and the IP address "1.2.1.3" of the request origin terminal (terminal 10*aa*) to the destination terminal (terminal 10*db*) from the transmitting-receiving section 51 through the communications network 2 (step S61-2). The prior transmission request start information indicates that the management system 50 causes the terminals to start transmitting the prior transmission request information, and includes the session ID "se1" and the respective IP addresses ("1.2.1.2" and "1.2.2.2") of the relaying apparatuses (30*a* and 30b) selected at step S46. As a result, the request origin terminal (terminal 10aa) and the destination terminal (terminal 10db) can grasp the IP addresses of the relaying apparatuses (30a and 30b) by which the prior transmission request information is relayed in the selection processing of the relaying apparatus 30 executed by using the session ID "se1". Meanwhile, the request origin terminal (terminal 10aa) and the destination terminal (terminal 10db) can also grasp the IP address "1.1.1.2" of the management system serving as the transmission origin of the prior transmission request start information.

Then, the request origin terminal (terminal 10aa) serving as the second terminal starts transmitting the prior transmission request information to the relaying apparatus 30a from the transmitting-receiving section 11 through the communications network 2, and transmits the IP address "1.3.2.4" of the destination terminal (terminal 10db) received at step S61-1 to the relaying apparatus 30a (step S62-1-1). The prior transmission request information indicates that the information requests the destination terminal to transmit the first prior transmission information including the ping, which is described later, and includes the session ID "se1".

Then, the transmitting-receiving section 31 of the relaying apparatus 30a refers to the IP address of the destination terminal (terminal 10db) received at step S62-1-1, and transmits the prior transmission request information received at step S62-1-1 to the destination terminal (terminal 10db) serving as the first terminal through the communications network 2 (step S63-1-1).

The destination terminal (terminal 10db) transmits the first prior transmission information to the relaying apparatus 30a from the transmitting-receiving section 11 through the communications network 2 as a reply for the transmission at step S63-1-1 (step S64-1-1). The first prior transmission information is used for measuring a necessary period of time from the transmission of the first prior transmission information at the first terminal (terminal 10db) to the reception of the first prior transmission information at the second terminal (terminal 10aa) by being transmitted to the terminal 10aa serving as the other party through each relaying apparatus 30 instead of image data and voice data prior to the transmission of the image data and the voice data. The first prior transmission information includes the ping for confirming that the first terminal (terminal 10db), the relaying apparatus 30, and the second terminal (terminal 10aa) are coupled so as to enable communications among them, the first transmission date information indicating the first transmission date at which the first prior transmission information was transmitted from the first terminal (terminal 10db), and the session ID "se1". As a result, the relaying apparatus 30a can grasp the reception of the transmitted first prior transmission information in the session executed by using the selection session ID "se1", and the IP address "1.3.2.4" of the first terminal (terminal 10db) serving as the transmission origin of the first prior transmission information.

Then, the relaying apparatus 30a transmits the first prior transmission information received at step S64-1-1 to the second terminal (terminal 10aa) serving as the transmission origin at step S62-1-1 (step S65-1-1). As a result, the second terminal (terminal 10aa) can grasp the reception of the transmitted first prior transmission information in the session executed by using the selection session ID "se1", and the IP address "1.2.1.2" of the relaying apparatus 30a serving as the transmission origin (relaying origin) of the first prior transmission information.

The measurement section 16, which is illustrated in FIG. 8, of the second terminal (terminal 10aa) measures the receiving date at which the first prior transmission information transmitted from the relaying apparatus 30a is received (step S66-1-1).

Then, the transmitting-receiving section 11 of the first terminal (terminal 10aa) transmits first transmitting-receiving result information to the management system 50 for each session ID and each IP address of the relaying apparatuses (step S67-1-1). The first transmitting-receiving result information includes the session ID "se1", the IP address "1.2.1.2" of the relaying apparatus 30a, the first transmission date information received at step S65-1-1, and the first receiving date information indicating the first receiving date measured at step S66-1-1. As a result, the management system 50 receives the first transmitting-receiving result information and can grasp the IP address "1.2.1.3" of the second terminal (terminal 10aa) serving as the transmission origin of the first transmitting-receiving result information.

The request origin terminal (terminal 10aa) serving as the second terminal performs communications with the destination terminal (terminal 10db) serving as the first terminal at steps S62-1-1 to S67-1-1 through the relaying apparatus 30a as described above. Furthermore, the request origin terminal (terminal 10aa) serving as the second terminal performs communications with the destination terminal (terminal 10db) serving as the first terminal through the relaying apparatus 30b in the same manner as that through the relaying apparatus 30a (steps S62-1-2 to S67-1-2).

Then, the destination terminal (terminal 10db) serving as the first terminal starts transmitting the prior transmission request information to the relaying apparatus 30a from the transmitting-receiving section 11 through the communications network 2, and transmits the IP address "1.2.1.3" of the request origin terminal (terminal 10aa) received at step S61-2 to the relaying apparatus 30a (step S62-2-1). The prior transmission request information indicates that the information requests the request origin terminal to transmit the second prior transmission information including the ping, which is described later, and includes the session ID "se1".

Then, the transmitting-receiving section 31 of the relaying apparatus 30a refers to the IP address of the request origin terminal (terminal 10aa) received at step S62-2-1, and transmits the prior transmission request information received at step S62-2-1 to the request origin terminal (terminal 10aa) serving as the second terminal through the communications network 2 (step S63-2-1).

The request origin terminal (terminal 10aa) transmits the second prior transmission information to the relaying apparatus 30a from the transmitting-receiving section 11 through the communications network 2 as a reply for the transmission at step S63-2-1 (step S64-2-1). The second prior transmission information is used for measuring a necessary period of time from the transmission of the second prior transmission information at the second terminal (terminal 10aa) to the reception of the second prior transmission information at the first terminal (terminal 10db) by being transmitted to the terminal 10db serving as the other party through each relaying apparatus 30 instead of image data and voice data prior to the transmission of the image data and the voice data. The second prior transmission information includes the ping for confirming that the second terminal (terminal 10aa), the relaying apparatus 30, and the first terminal (terminal 10db) are coupled so as to enable communications among them, the second transmission date information indicating the second transmission date at which the second prior transmission information was transmitted from the second terminal (terminal 10aa), and the session ID "se1". As a result, the relaying apparatus 30a can grasp the reception of the transmitted second prior transmission information in the session executed by using the selection session ID "se1", and the IP address "1.3.1.3" of the second terminal (terminal 10aa) serving as the transmission origin of the second prior transmission information.

Then, the relaying apparatus 30a transmits the second prior transmission information received at step S64-2-1 to the first terminal (terminal 10db) serving as the transmission origin at step S62-2-1 (step S65-2-1). As a result, the first terminal (terminal 10db) can grasp the reception of the transmitted second prior transmission information in the session executed by using the selection session ID "se1", and the IP address "1.2.1.2" of the relaying apparatus 30a serving as the transmission origin (relaying origin) of the second prior transmission information.

The measurement section 16, which is illustrated in FIG. 8, of the first terminal (terminal 10db) measures the receiving date at which the second prior transmission information transmitted from the relaying apparatus 30a is received (step S66-2-1).

Then, the transmitting-receiving section 11 of the second terminal (terminal 10db) transmits second transmitting-receiving result information to the management system 50 for each session ID and each IP address of the relaying apparatuses (step S67-2-1). The second transmitting-receiving result information includes the session ID "se1", the IP address "1.2.1.2" of the relaying apparatus 30a, the second transmission date information received at step S65-2-1, and the second receiving date information indicating the second receiving date measured at step S66-2-1. As a result, the management system 50 receives the second transmitting-receiving result information and can grasp the IP address "1.3.2.4" of the first terminal (terminal 10db) serving as the transmission origin of the second transmitting-receiving result information.

The destination terminal (terminal 10db) serving as the first terminal performs communications with the request origin terminal (terminal 10aa) serving as the second terminal through the relaying apparatus 30a at steps S62-2-1 to S67-2-1 as described above. Furthermore, the destination terminal (terminal 10db) serving as the first terminal performs communications with the request origin terminal (terminal 10aa) serving as the second terminal through the relaying apparatus 30b in the same manner as that through the relaying apparatus 30a (steps S62-2-2 to S67-2-2).

Then, the final filtering section 61 of the management system 50 finally selects the relaying apparatus 30 that relays image data and voice data in telephone conversations in the telephone conference on the basis of the first transmitting-receiving result information and the second transmitting-receiving result information (step S68).

The processing performed at step S68 is described in further detail below with reference to FIGS. 8 and 26. The calculation section 61a of the final filtering section 61 illustrated in FIG. 8 calculates the first necessary period of time (t1) from transmitting to receiving the first prior transmission information, for each IP address of the relaying apparatuses (30a and 30b) in the session executed by using the session ID "se1", on the basis of a time difference between the first receiving date (tr1) indicated by the first receiving date information and the first transmission date (tt1) indicated by the first transmission date information (step S68-1). Likewise, the calculation section 61a calculates the second necessary period of time (t2) from transmitting to receiving the second prior transmission information, for each IP address of the relaying apparatuses (30a and 30b) in the session executed by using the session ID "se1", on the basis of a time difference between the second receiving date (tr2) indicated by the second receiving date information and the second transmission date (tt2) indicated by the second transmission date information (step S68-1).

Then, the calculation section 61a calculates the total necessary period of time (T) by summing the first necessary period of time (t1) and the second necessary period of time (t2) calculated at step S74-1 for each IP address of the relaying apparatuses (30a and 30b) in the session executed by using the session ID "se1" (step S68-2).

Then, the final selection section 61b determines whether the number of total necessary periods of time (T) calculated at step S68-2 is equal to the number of relaying apparatuses (30a and 30b) that are to be used for relaying (in this case, "2") in the session executed by using the session ID "se1" (step S68-3): If all of the total necessary periods of time (T) are not yet calculated (No at step S68-3), the final selection section 61b determines whether a predetermined period of time (in this case, one minute) elapses from the starting of the calculation of the total necessary period of time (T) at step S68-2 (step S68-4). In addition, if the predetermined period of time has not elapsed (No at step S68-3), the processing returns to step S68-1. On the other hand, if all of the total necessary periods of time (T) are calculated (Yes at step S68-3), or if the predetermined period of time elapses (Yes at step S68-4), the final selection section 61b selects the relaying apparatus 30 related to the shortest total necessary period of time (T) in the total necessary periods of time (T) having been calculated by the calculation section 61a (step S68-5). That is, the final selection section 61b selects the relaying apparatus 30 that has received the first prior transmission information and the second prior transmission information by which the shortest total necessary period of time (T) has been calculated in the total necessary periods of time (T) having been calculated by the calculation section 61a. In the embodiment, the relaying apparatus 30a is selected as an example on the assumption that the total necessary period of time (T) of the first prior transmission information and the second prior transmission information received by the relaying apparatus 30a is shorter than the total necessary period of time (T) of the first prior transmission information and the second prior transmission information received by the relaying apparatus 30b.

The relaying apparatus related to either the first prior transmission time or the second prior transmission time of the shortest time may be selected at step S68-5 without calculating the total necessary period of time at step S68-2 by eliminating either the first prior transmission information or the second prior transmission information.

Referring back to FIG. 25, the session management section 57 of the management system 50 stores the relaying apparatus ID "111a" of the finally selected relaying apparatus 30a in a field of the relaying apparatus ID of a record including the session ID "se1" in the session management table of the session management DB 5005 (refer to FIG. 15) and manages it (step S69). Then, the transmitting-receiving section 51 of the management system 50 transmits relay start request information indicating a request for starting a relay to the relaying apparatus 30a through the communications network 2 (step S70). The relay start request information includes the respective IP addresses ("1.2.1.3" and "1.3.2.4") of the request origin terminal (terminal 10aa) and the destination terminal (terminal 10db) that are the relay destinations. As a result, the relaying apparatus 30a can grasp that the relaying apparatus 30a itself has been selected and establish a session for transmitting three pieces of image data of low resolution, medium resolution, and high resolution and voice data between the terminals (10*aa* and 10*db*) (step S71). Accordingly, the terminals (10*aa* and 10*db*) can start a telephone conversation in a television conference.

Processing to transmit and receive image data and voice data for telephone conversations in a television conference between the request origin terminal and the destination terminal is described below with reference to FIGS. 7 and 26. The request origin terminal (terminal 10*aa*) transmits image data of a subject imaged by the image capturing section 14, and voice data of a voice received by the voice input section 15*a* to the relaying apparatus 30*a* from the transmitting-receiving section 11 through the communications network 2 by the image/voice data session "sed" (step S81). In the embodiment, high image quality image data including three pieces of image data of low resolution, medium resolution, and high resolution illustrated in FIGS. 3A to 3C and voice data are transmitted. As a result, in the relaying apparatus 30*a*, the transmitting-receiving section 31 receives the image data composed of three pieces of different resolution image data and the voice data. The data quality confirmation section 33 searches the quality change management DB 3001 (refer to FIG. 10) by using the IP address "1.3.2.4" of the destination terminal (terminal 10*db*) as a searching key, extracts the image quality, which corresponds to the IP address, of the image data to be relayed, and confirms the image quality of the image data to be relayed (step S82). In the embodiment, the confirmed image quality of the image data is "high image quality", which is the same as that of the image data received by the transmitting-receiving section 31. Accordingly, the relaying apparatus 30*a* transmits the image data and the voice data to the destination terminal (terminal 10*db*) without any change by the image/voice data session sed (step S83). As a result, the transmitting-receiving section 11 of the destination terminal (terminal 10*db*) receives the high image quality image data composed of three pieces of image data of low resolution, medium resolution, and high resolution and the voice data. The display control section 17 can combine the three pieces of image data having different image quality levels, cause the display 120 to display the resulting image, and cause the voice output section 15*b* to output a voice based on the voice data.

Then, the delay detection section 18 of the terminal 10*db* detects the delay time in receiving of image data received by the transmitting-receiving section 11 at a regular time intervals (e.g., every one second) (step S84). In the embodiment, the following description is made on a case in which the delay time is 200 (ms).

The transmitting-receiving section 11 of the destination terminal (terminal 10*db*) transmits delay information indicating the delay time "200 (ms)" to the management system 50 through the communications network 2 by the management information session sei (step S85). As a result, the management system 50 can grasp the delay time and the IP address "1.3.2.4" of the terminal 10*db* serving as the transmission origin of the delay information.

Then, the delay time management section 60 of the management system 50 searches the terminal management DB 5003 (refer to FIG. 13) by using the IP address "1.3.2.4" of the destination terminal (terminal 10*db*) as a searching key, and extracts the terminal ID "01*db*" corresponding to the IP address. In addition, the delay time management section 60 stores the delay time "200 (ms)" indicated by the delay information in the field of the delay time of the record of the terminal ID "01*db*" in the session management table of the session management DB 5005 (refer to FIG. 15) and manages it (step S86).

Then, the quality determination section 58 searches the quality management DB 5007 (refer to FIG. 18) by using the delay time "200 (ms)" as a searching key, extracts the image quality "medium image quality" of the image data corresponding to the delay time, and determines the image quality as the "medium image quality" (step S87).

Then, the transmitting-receiving section 51 searches the relaying apparatus management DB 5001 (refer to FIG. 11) by using the relaying apparatus ID "111*a*" associated with the terminal ID "01*db*" in the session management table of the session management DB (refer to FIG. 15) as a searching key, and extracts the IP address "1.2.1.2" of the relaying apparatus 30*a* corresponding to the relaying apparatus ID (step S88). The transmitting-receiving section 51 transmits the quality information indicating the image quality "medium image quality" of the image data determined at step S87 to the relaying apparatus 30*a* through the communications network 2 by the management information session "sei" (step S89). The quality information includes the IP address "1.3.2.4" of the destination terminal (terminal 10*db*) used as the searching key at step S86. As a result, the quality change management section 34 of the relaying apparatus 30*a* stores the IP address "1.3.2.4" of the terminal 10 serving as the transmission destination (in this case, the terminal 10*db*) and the image quality "medium image quality" of the image data to be relayed in the quality change management DB 3001 (refer to FIG. 10) and manages them in association with each other (step S90).

Then, the terminal 10*aa* transmits the high image quality image data composed of three pieces of image data of low resolution, medium resolution, and high resolution and the voice data to the relaying apparatus 30*a* by the image/voice data session "sed" in the same manner as step S81 (step S91). As a result, the data quality confirmation section 33 searches the quality change management DB 3001 (refer to FIG. 10) by using the IP address "1.3.2.4" of the destination terminal (terminal 10*db*) as a searching key, extracts the image quality "medium image quality", which corresponds to the IP address, of the image data to be relayed, and confirms the image quality of the image data to be relayed in the same manner as step S82 (step S92). In the embodiment, the confirmed image quality of the image data is "medium image quality", which is lower than the image quality "high image quality" of the image data received by the transmitting-receiving section 31. Therefore, the data quality change section 35 changes the image quality of the image data by suppressing the image quality of the image data from "high image quality" to "medium image quality" (step S93).

Then, the transmitting-receiving section 31 transmits the image data the image quality of which has been changed to "medium image quality" and the voice data the sound quality of which has not been changed to the terminal 10*db* through the communications network 2 by the image/voice data session "sed" (step S94). As a result, the transmitting-receiving section 11 of the destination terminal (terminal 10*db*) receives the medium image quality image data composed of two pieces of image data of low resolution and medium resolution, and the voice data. Then, the display control section 17 can combine the two pieces of image data having different resolutions, cause the display 120 to display the resulting image, and cause the voice output section 15*b* to output a voice based on the voice data.

In this way, when delay in receiving occurs in the destination terminal (terminal 10*db*) that receives image data, the relaying apparatus 30*a* changes the image quality such that persons who are attending the television conference feel no strangeness due to the delay in the communications.

<<Major Effects of the Embodiment>>

According to the embodiment as described above, it is difficult to grasp the environment of the whole of the Internet $2i$ while the environment of the LAN 2 such as the IP address of the relaying apparatus 30 can be grasped in the communications network 2. Therefore, first, two or more relaying apparatuses 30 are selected among the relaying apparatuses 30 that relay image data and voice data in accordance with information of a graspable environment. Then, the first prior transmission information or the second prior transmission information is transmitted and received between the terminals 10 instead of image data and voice data before the image data and voice data are practically transmitted and received. As a result, the relaying apparatus 30 that can actually relay the prior transmission information in the shortest period of time can be selected. As a result, the relaying apparatus that relays high quality content data in the shortest period of time under the actual environment of the communications network can be selected.

The management system 50 selects the relaying apparatus that has relayed the prior transmission information in the shortest total necessary period of time among the relaying apparatuses prior to transmitting and receiving image data and voice data between the terminals 10. As a result, the relaying apparatus that relays high quality content data in the shortest period of time under the more actual environment of the communications network can be selected.

In the embodiment, two or more relaying apparatuses 30 are selected not only by preferentially selecting the relaying apparatus 30 having the IP address similar to any of the IP addresses of the terminals 10 performing a television conference but also taking the maximum data transmission speed of each relaying apparatus 30 into consideration. As a result, the candidates of the relaying apparatus 30 can be selected that fit the actual environment of the communications network 2.

In the embodiment, the relaying apparatuses 30 are selected among the relaying apparatuses 30 in online. As a result, the candidates of the relaying apparatus 30 can be selected that fit the actual environment of the communications network 2.

<<Second Embodiment>>

Figure 28:
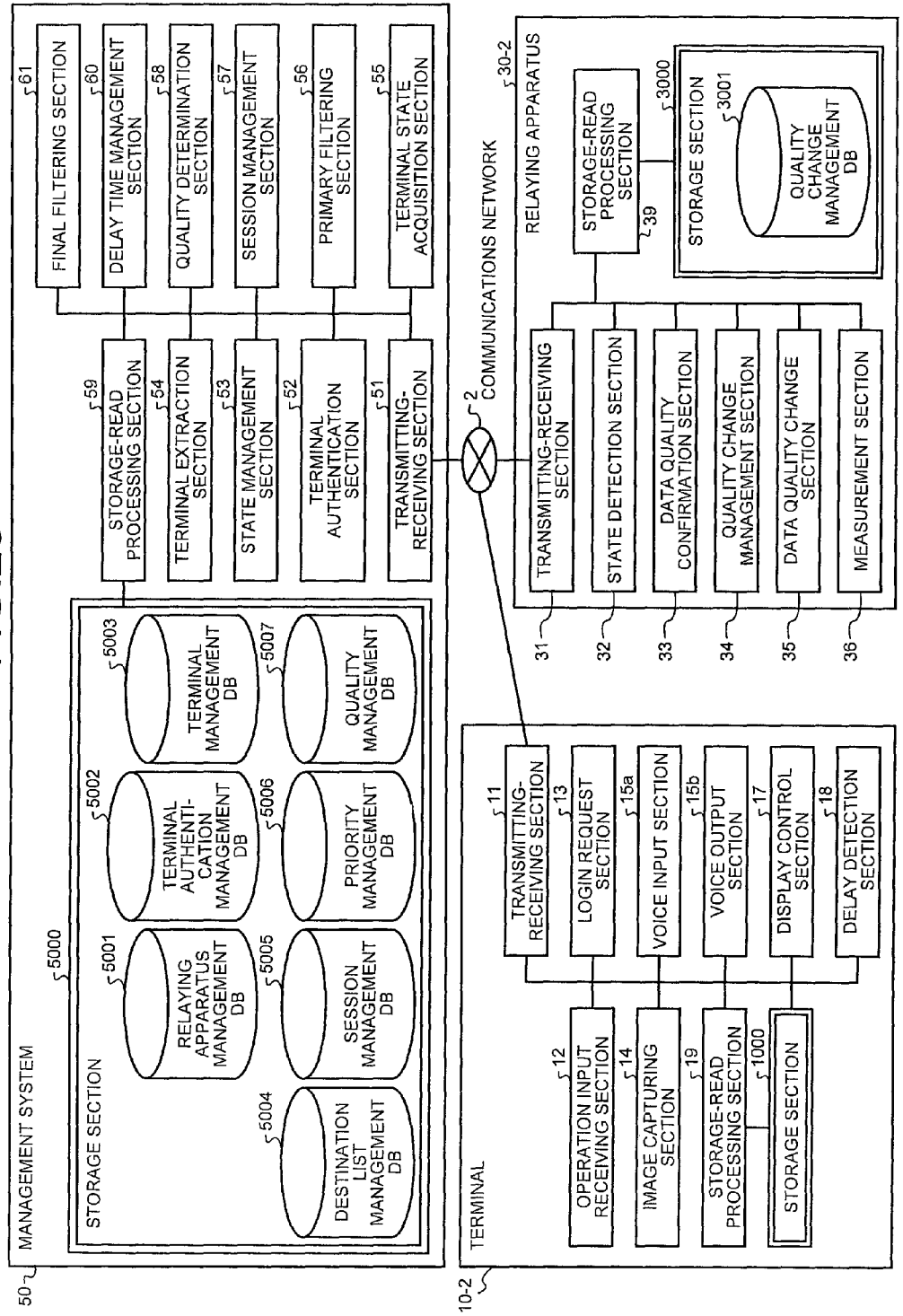
FIG. 28 is a functional block diagram of each terminal, each relaying apparatus, and a management system included in a transmission system according to a second embodiment.

A second embodiment is described below with reference to FIGS. 28 to 30. FIG. 28 is a functional block diagram of each terminal, each apparatus, and the system included in the transmission system 1 of the second embodiment. In FIG. 28, a terminal 10-2, a relaying apparatus 30-2, and the management system 50 are coupled so as to enable data communications among them though the communications network 2.

<Functional Structure of Terminal and Relaying Apparatus>

The terminal 10-2 differs from the terminal 10 of the first embodiment (FIG. 7) in that the terminal 10-2 does not include the measurement section 16. The relaying apparatus 30-2 differs from the relaying apparatus 30 of the first embodiment in that the relaying apparatus 30-2 further includes a measurement section 36. That is, in the second embodiment, the function of the measurement section is included in the relaying apparatus 30-2 instead of the terminal 10-2.

The measurement section 36 measures the first receiving time (tr1) at which the transmitting-receiving section 31 receives the first prior transmission information and the second receiving time (tr2) at which the transmitting-receiving section 31 receives the second prior transmission information. The first prior transmission information and the second prior transmission information include the ping (Packet Internet Groper) for confirming that the relaying apparatus 30-2 and the terminal 10-2 that is the transmission origin of the prior transmission information are coupled so as to enable communications therebetween. The first prior transmission information is used for measuring a necessary period of time from the transmission of the first prior transmission information at the request origin terminal to the reception of the first prior transmission information at a relaying apparatus 30-2a by being transmitted to the relaying apparatus 30-2 instead of image data and voice data prior to the transmission of the image data and the voice data. The second prior transmission information is used for measuring a necessary period of time from the transmission of the second prior transmission information at the destination terminal to the reception of the second prior transmission information at the relaying apparatus 30-2a by being transmitted to the relaying apparatus 30-2 instead of image data and voice data prior to the transmission of the image data and the voice data.

Processing in which the management system 50 selects the relaying apparatus 30-2 is described below with reference to FIGS. 29 and 30.

First, prior to starting a telephone conversation in a television conference, the management system 50 transmits the prior transmission request information to the request origin terminal (terminal 10-2aa) and the destination terminal (terminal 10-2db) from the transmitting-receiving section 51 through the communications network 2 so as to cause the request origin terminal (terminal 10-2aa) and the destination terminal (terminal 10db) to transmit the prior transmission information including the ping (steps S101 and S102). The prior transmission request information includes the session ID "set" and the respective IP addresses ("1.2.1.2" and "1.2.2.2") of the relaying apparatuses (30a and 30b) selected at step S46. As a result, the request origin terminal (terminal 10-2aa) and the destination terminal (terminal 10-2db) can grasp the relaying apparatuses (30a and 30b) by which the prior transmission information is relayed in the selection processing of the relaying apparatus 30-2 executed by using the session ID "se1". Meanwhile, the request origin terminal (terminal 10-2aa) and the destination terminal (terminal 10-2db) can grasp the IP address "1.1.1.2" of the management system serving as the transmission origin of the prior transmission request information.

Then, the request origin terminal (terminal 10-2aa) transmits the first prior transmission information to the relaying apparatus 30-2a from the transmitting-receiving section 11 through the communications network 2 (steps S103).

The request origin terminal (terminal 10-2aa) stores the transmission date at which the transmitting-receiving section 11 transmitted the first prior transmission information in the storage section 1000 illustrated in FIG. 28 in association with the IP address of the relaying apparatus 30-2a to which the first prior transmission information has been transmitted (step S104).

The first prior transmission information includes the session ID "se1" and the ping. As a result, the relaying apparatus 30-2a can grasp the reception of the transmitted first prior transmission information in the session executed by using the selection session ID "se1", and the IP address "1.2.1.3" of the request origin terminal (terminal 10-2aa) serving as the transmission origin of the first prior transmission information.

In the relaying apparatus 30-2a, the measurement section 36 measures the first receiving date at which the transmitting-receiving section 31 received the first prior transmission information (step S105). The transmitting-receiving section 31 transmits first receiving result information that indicates the reception of the first prior transmission information transmitted at step S103 to the IP address "1.2.1.3" of the request origin terminal (terminal 10-2aa) received after the transmission at step S103 (step S106). The first receiving result information includes the session ID "se1" and the first receiving date information indicating the first receiving date measured at step S105. As a result, the request origin terminal (terminal 10-2aa) can grasp the reception of the transmitted first receiving result information in the session executed by using the session ID "se1", and the IP address "1.2.1.2" of the relaying apparatus 30-2a serving as the transmission origin of the first receiving result information.

Then, in the request origin terminal (terminal 10-2aa), the storage-read processing section 19 stores the first receiving date information included in the first receiving result information in the storage section 1000 (step S107). The first receiving date information is stored in association with the session ID "se1" and the IP address of the relaying apparatus 30-2a in order to identify the stored first receiving date information in the later step.

The processing is performed between the request origin terminal (terminal 10-2aa) and the relaying apparatus 30-2b in the same manner as that at steps S103 to S107 (steps S108 to S112 in FIG. 29).

Then, the storage-read processing section 19 of the request origin terminal (terminal 10-2aa) reads, from the storage section 1000 on the basis of the session ID "se1", the first transmission date information and the first receiving date information corresponding to the session ID for each IP address of the relaying apparatuses (step S113). The transmitting-receiving section 11 transmits the first transmitting-receiving result information to the management system 50 through the communications network 2 for each session ID and each IP address of the relaying apparatuses (step S114). The first transmitting-receiving result information includes the session ID "se1", the IP addresses ("1.2.1.2" and "1.2.2.1") of the relaying apparatus 30-2a, the first transmission date information stored at steps S63-1 and S68-2, and the first receiving date information stored at steps S66-1 and S71-1. As a result, the management system 50 receives the first transmitting-receiving result information and can grasp the IP address "1.2.1.3" of the request origin terminal (terminal 10-2aa) serving as the transmission origin of the first transmitting-receiving result information.

On the other hand, as illustrated in FIG. 30, the destination terminal (terminal 10-2db) transmits the second prior transmission information to the relaying apparatus 30-2a from the transmitting-receiving section 11 through the communications network 2 (step S121).

The destination terminal (terminal 10-2db) stores the transmission date at which the transmitting-receiving section 11 transmitted the second prior transmission information in the storage section 1000 illustrated in FIG. 28 in association with the IP address of the relaying apparatus 30-2a to which the second prior transmission information has been transmitted (step S122).

The second prior transmission information includes the session ID "se1" and the ping. As a result, the relaying apparatus 30-2a can grasp that the reception of the transmitted second prior transmission information in the session executed by using the selection session ID "se1", and the IP address "1.3.2.4" of the destination terminal (terminal 10-2db) serving as the transmission origin of the second prior transmission information.

In the relaying apparatus 30-2a, the measurement section 36 measures the second receiving date at which the transmitting-receiving section 31 received the second prior transmission information (step S123). The transmitting-receiving section 31 transmits second receiving result information that indicates the reception of the second prior transmission information transmitted at step S121 to the IP address "1.3.2.4" of the destination terminal (terminal 10-2db) received after the transmission at step S121 (step S124). The second receiving result information includes the session ID "se1" and the second receiving date information indicating the second receiving date measured at step S123. As a result, the destination terminal (terminal 10-2db) can grasp the reception of the transmitted second receiving result information in the session executed by using the session ID "se1", and the IP address "1.3.2.4" of the relaying apparatus 30-2a serving as the transmission origin of the second receiving result information.

Then, in the destination terminal (terminal 10-2db), the storage-read processing section 19 stores the second receiving date information included in the second receiving result information in the storage section 1000 (step S125). The second receiving date information is stored in association with the session ID "se1" and the IP address of the relaying apparatus 30-2a in order to identify the stored second receiving date information in the later step.

The processing is performed between the destination terminal (terminal 10-2db) and the relaying apparatus 30-2b in the same manner as that at steps S121 to S125 (steps S126 to S130 in FIG. 30).

Then, the storage-read processing section 19 of the destination terminal (terminal 10-2db) reads, from the storage section 1000 on the basis of the session ID "se1", the second transmission date information and the second receiving date information corresponding to the session ID for each IP address of the relaying apparatuses (step S131). The transmitting-receiving section 11 transmits the second transmitting-receiving result information to the management system 50 through the communications network 2 for each session ID and each IP address of the relaying apparatuses (step S132). The second transmitting-receiving result information includes the session ID "se1", the IP address "1.2.2.2" of the relaying apparatus 30-2b, the second transmission date information stored at steps S63-2 and S68-2, and the second receiving date information stored at steps S66-2 and S71-2. As a result, the management system 50 receives the second transmitting-receiving result information and can grasp the IP address "1.3.2.4" of the destination terminal (terminal 10-2db) serving as the transmission origin of the second transmitting-receiving result information.

Then, the final filtering section 61 of the management system 50 finally selects the relaying apparatus 30-2 that relays image data and voice data in telephone conversations in the telephone conference on the basis of the first transmitting-receiving result information and the second transmitting-receiving result information (step S133).

<<Major Effects of the Embodiment>>

According to the embodiment as described above, it is difficult to grasp the environment of the whole of the Internet 2i while the environment of the LAN 2 such as the IP address of the relaying apparatus 30-2 can be grasped in the communications network 2. Therefore, first, two or more relaying apparatuses 30-2 are selected among the relaying apparatuses 30-2 that relay image data and voice data in accordance with information of a graspable environment. Then, the prior transmission information is transmitted and received between the terminals 10-2 instead of image data and voice data before the image data and voice data are practically transmitted and received. As a result, the relaying apparatus 30-2 that can actually relay the prior transmission information in the shortest period of time can be selected.

That is, two or more relaying apparatuses 30-2 having the top two or more IP addresses similar to any of the IP addresses of the terminals 10-2 are selected. As a result, two or more candidates of the relaying apparatus 30-2 finally to be used can remain. The measurement section 36 of the relaying apparatus 30-2 measures first receiving time at which the first prior transmission information is received and second receiving time at which the second prior transmission information is received. Then, the transmitting-receiving section 31 transmits the first receiving time information indicating the measured first receiving time to the first transmission terminal and the second receiving time information indicating the measured second receiving time to the second transmission terminal. The first transmission terminal transmits, to the management system 50, the received first receiving time and first transmission time at which the first transmission terminal transmits the first prior transmission information. On the other hand, the second transmission terminal transmits, to the management system 50, the received second receiving time and second transmission time at which the second transmission terminal transmits the second prior transmission information. As a result, the management system 50 calculates the first necessary period of time on the basis of a difference between the first receiving time and the first transmission time, the second necessary period of time on the basis of a difference between the second receiving time and the second transmission time, and the total necessary period of time by summing the first and the second necessary periods of time. The management system 50 calculates the total necessary period of time to which the relaying apparatus relates for each relaying apparatus in this way, and selects the relaying apparatus related to the shortest necessary period of time among the relaying apparatuses. As a result of the selection, the relaying apparatus can be selected which relays the highest quality content data under the actual environment of the communications network.

In the embodiment, two or more relaying apparatuses 30-2 are selected not only by preferentially selecting the relaying apparatus 30-2 having the IP address similar to any of the IP addresses of the terminals 10-2 performing a television conference but also taking the maximum data transmission speed of each relaying apparatus 30-2 into consideration. As a result, the candidates of the relaying apparatus 30-2 can be selected that fit the actual environment of the communications network 2.

In the embodiment, the relaying apparatuses 30-2 are selected among the relaying apparatuses 30-2 in online. As a result, the candidates of the relaying apparatus 30-2 can be selected that fit the actual environment of the communications network 2.

EXAMPLE 1

A relaying apparatus that relays content data for a conversation between first and second transmission terminals, the relaying apparatus including: receiving unit that receives first prior transmission information transmitted from the first transmission terminal and second prior transmission information transmitted from the second transmission terminal prior to transmitting and receiving the content data between the first and the second transmission terminals; measuring unit that measures first receiving time at which the receiving unit receives the first prior transmission information and second receiving time at which the receiving unit receives the second prior transmission information; and a relaying apparatus's transmitting unit that transmits first receiving time information indicating the measured first receiving time to the first transmission terminal and second receiving time information indicating the measured second receiving time to the second transmission terminal.

EXAMPLE 2

A transmission system including: the relaying apparatus, the first and the second transmission terminals, and a transmission management system selecting one of a plurality of relaying apparatuses relaying content data for a conversation between the first and the second transmission terminals as the relaying apparatus actually relaying the content data. In the transmission system, the first transmission terminal includes a first terminal's transmitting unit that transmits, to the transmission management system, the received first receiving time information and first transmission time information indicating transmission time at which the first transmission terminal transmits the first prior transmission information, and the second transmission terminal includes a second terminal's transmitting unit that transmits, to the transmission management system, the received second receiving time information and second transmission time information indicating transmission time at which the second transmission terminal transmits the second prior transmission information, and the transmission management system includes a calculating unit that calculates a first necessary period of time from transmitting to receiving the first prior transmission information on the basis of a difference between the receiving time indicated by the first receiving time information and the transmission time indicated by the first transmission time information, a second necessary period of time from transmitting to receiving the second prior transmission information on the basis of a difference between the receiving time indicated by the second receiving time information and the transmission time indicated by the second transmission time information, and a total necessary period of time that is a sum of the first and the second necessary periods of time.

EXAMPLE 3

The transmission system according to the Example 2, further including a selection unit that selects the relaying apparatus related to the shortest total necessary period of time among the relaying apparatuses.

EXAMPLE 4

A program that causes the computer to function as each unit according to the Example 1.

EXAMPLE 5

A program supply system that supplies the program according to the Example 4 to the relaying apparatus through a communications network.

EXAMPLE 6

A maintenance system performs maintenance of the relaying apparatus according to the Example 1.

[Supplemental Explanation of the Embodiments]

The relaying apparatuses (the relaying apparatus 30 and the relaying apparatus 30-2), the management system 50, the program supply system 90, and the maintenance system 100 in each of the embodiments may be structured by a single computer. Their components (functions or means) may be divided and the divided components may be structured by a plurality of computers each allocated for any component. When the program supply system 90 is structured by a single computer, a program transmitted by the program supply system 90 may be transmitted as a plurality of divided modules or transmitted without being divided. When the program supply system 90 is structured by a plurality of computers, a program may be transmitted from the computers as a plurality of divided modules.

The recording medium in which the terminal program, the relaying apparatus program, and the transmission management program of each embodiment are stored, the HD 204 that stores therein the programs, and the program supply system 90 including the HD 204 are used as program products when the terminal program, the relaying apparatus program, and the transmission management program are provided to a user and the like in domestically or overseas.

In the embodiments, as an example of quality of an image represented by image data relayed by the relaying apparatus, attention is paid on the resolution of the image represented by the image data and the resolution is managed by the quality change management table illustrated in FIG. 10 and the quality management table illustrated in FIG. 18. The image quality is not limited to the resolution. As other examples of quality, attention may be paid on the depth of image quality of the image represented by the image data, the sampling frequency of a voice in voice data, and the bit length of a voice in voice data to manage the quality. Voice data may be transmitted and received by being divided into three pieces of data having different resolutions (high resolution, medium resolution, and low resolution).

In FIGS. 11, 13, and 15, the receiving date is managed. The management item is not limited to the receiving date. At least receiving time may be managed in the receiving date.

In the embodiments, the IP address of the relaying apparatus is managed in FIG. 11 while the IP address of the terminal is managed in FIG. 13. However, the management item is not limited to the IP address. Each FQDN (Fully Qualified Domain Name) of the relaying apparatus and the terminal may be managed as relay apparatus identification information for identifying the relaying apparatus on the communications network 2 or terminal identification information for identifying the terminal on the communications network 2. In this case, the IP address corresponding to the FQDN is acquired by a known DNS (Domain Name System) server. The expression of "the relaying apparatus identification information for identifying the relaying apparatus on the communications network 2" may be also expressed as "the relaying apparatus connection destination information indicating the connection destination to the relaying apparatus on the communications network 2" or "the relaying apparatus destination information indicating the destination to the relaying apparatus on the communications network 2". Likewise, the expression of "the terminal identification information for identifying the terminal on the communications network 2" may be also expressed as "the terminal connection destination information indicating the connection destination to the terminal on the communications network 2" or "the terminal destination information indicating the destination to the terminal on the communications network 2".

In the embodiments, the television conference system is described as an example of the transmission system 1. However, the transmission system 1 is not limited to be applied to the television conference system. The transmission system 1 may be applicable to a telephone system such as an IP (Internet Protocol) telephone and an Internet telephone. The transmission system 1 may be a car navigation system. In this case, the terminal on one side corresponds to a car navigation system installed in a vehicle while the terminal on the other side corresponds to a management terminal or a management server of a management center that manages the car navigation or another car navigation system installed in another vehicle. The transmission system 1 may be a communication system of cell phones. In this case, the terminal corresponds to the cell phone, for example.

In the embodiments, image data and voice data are described as an example of the content data. However, the data is not limited to the image data and the voice data. Touch data may be applicable. In this case, a sense of touch obtained by a user at a terminal on one side is transmitted to another terminal on the other side. The content data may be olfaction (smell) data. In this case, an aroma (smell) at a terminal on one side is transmitted to another terminal on the other side. The content data may be at least one piece of image data, voice data, touch data, and olfaction data.

In the embodiments, the television conference is held by using the transmission system 1. However, the transmission system 1 is not limited to be used for the television conference. The transmission system 1 may be used for meetings, general conversations among family members or friends or information supply in one direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission management apparatus that selects a relaying apparatus to actually relay content data between a first terminal and a second terminal that are communicatively coupled to the transmission management apparatus via a network, from a plurality of relaying apparatuses capable of relaying the content data for conversation between the first and second terminals, the management apparatus comprising:

a receiver that receives, from the second terminal via the network, a first transmission time information and a first receiving time information before the content data is transmitted and received between the first and second terminals via the network, the first transmission time information indicating a transmission time point when prior transmission information is transmitted from the first terminal, the first receiving time information indicating a receiving time point when the prior transmission information is received at the second terminal, the prior transmission information being separately relayed by each of the relaying apparatuses after being transmitted from the first terminal and before being received at the second terminal via the network;

processing circuitry that
calculates a first necessary time period from when the first terminal transmits the prior transmission information to when the second terminal receives the prior transmission information, based on a time difference between the receiving time point indicated by the first receiving time information and the transmission time point indicated by the first transmission information, for each relaying apparatus through which the prior transmission information is relayed; and
selects the relaying apparatus through which the prior transmission information is relayed with a minimum first necessary time period, from among the plurality of relaying apparatuses.

2. The transmission management apparatus according to claim 1, wherein the first transmission time information is contained in the prior transmission information transmitted from the first terminal to the second terminal.

3. The transmission management apparatus according to claim 1, wherein
the receiver receives a second transmission time information and a second receiving time information before the content data is transmitted and received between the first and second terminals, the second transmission time information indicating a transmission time point when prior transmission information is transmitted from the second terminal, the second receiving time information indicating a receiving time point when the prior transmission information is received at the first terminal, the prior transmission information being separately relayed by each of the relaying apparatuses after being transmitted from the second terminal and before being received at the first terminal,
the processing circuitry calculates a second necessary time period from when the second terminal transmits the prior transmission information to when the first terminal receives the prior transmission information, based on a time difference between a receiving time point indicated by the second receiving time information and a transmission time point indicated by the second transmission time information, for each relaying apparatus through which the prior transmission information is relayed,
the processing circuitry calculates a total necessary time period which is a sum of the first necessary time period and the second necessary time period, and
the processing circuitry selects the relaying apparatus through which the prior transmission information is relayed with a minimum total necessary time period, from among the plurality of relaying apparatuses.

4. The transmission management apparatus according to claim 3, wherein
the second transmission time information is contained in the prior transmission information transmitted from the second terminal to the first terminal via the network, and
the receiver receives the second transmission time information and the second receiving time information from the first terminal.

5. A transmission system comprising the first terminal, the second terminal, and the transmission management apparatus according to claim 1.

6. A selection method that selects a relaying apparatus to actually relay content data between a first terminal and a second terminal that are communicatively coupled to a transmission management apparatus via a network, from a plurality of relaying apparatuses capable of relaying the content data for conversation between the first and second terminals, the selection method comprising:
receiving, from the second terminal via the network, a first transmission time information and a first receiving time information before the content data is transmitted and received between the first and second terminals via the network, the first transmission time information indicating a transmission time point when prior transmission information is transmitted from the first terminal, the first receiving time information indicating a receiving time point when the prior transmission information is received at the second terminal, the prior transmission information being separately relayed by each of the relaying apparatuses after being transmitted from the first terminal and before being received at the second terminal via the network;
calculating a first necessary time period from when the first terminal transmits the prior transmission information to when the second terminal receives the prior transmission information, based on a time difference between the receiving time point indicated by the first receiving time information and the transmission time point indicated by the first transmission information, for each relaying apparatus through which the prior transmission information is relayed;
selecting the relaying apparatus through which the prior transmission information is relayed with a minimum first necessary time period, from among the plurality of relaying apparatuses.

7. A computer program product comprising a non-transitory computer-readable medium having computer-readable program codes embodied in the medium, the program codes when executed causing the transmission management apparatus to function as each unit according to claim 1.

8. A program supply system that supplies the program codes according to claim 7 to the transmission management apparatus through a communications network.

9. A maintenance system that performs maintenance of the transmission management apparatus according to claim 1.

10. The transmission management apparatus according to claim 1, further comprising a transmitter that transmits, via the network, relay start request information including address information of the first terminal and address information of the second terminal to the selected relaying apparatus to establish sessions among the first terminal, the second terminal, and the selected relaying apparatus.

11. The transmission management apparatus of claim 1, wherein the second terminal is a request origination terminal that request a teleconference and the first terminal is a destination terminal.

12. The transmission management apparatus of claim 1, wherein the processing circuitry transmits identification information of the plurality of relaying apparatuses to the first terminal and the second terminal before the prior transmission information is transmitted from the first terminal.

* * * * *